US010889440B2

(12) United States Patent
Perry-Eaton et al.

(10) Patent No.: US 10,889,440 B2
(45) Date of Patent: Jan. 12, 2021

(54) SYSTEM FOR TRANSFERRING ARTICLES FROM A CONTAINER

(71) Applicant: United States Postal Service, Washington, DC (US)

(72) Inventors: Wayne Perry-Eaton, Leesburg, VA (US); George W. Potts, Jr., Upper Marlboro, MD (US); Daniel Radtke, Madison, WI (US)

(73) Assignee: United States Postal Service, Washington, DC (US)

(*) Notice: Subject to any disclaimer, the term of this patent is extended or adjusted under 35 U.S.C. 154(b) by 225 days.

(21) Appl. No.: 16/124,070

(22) Filed: Sep. 6, 2018

(65) Prior Publication Data

US 2019/0077598 A1 Mar. 14, 2019

Related U.S. Application Data

(60) Provisional application No. 62/556,233, filed on Sep. 8, 2017, provisional application No. 62/575,737, filed
(Continued)

(51) Int. Cl.
*B07C 3/08* (2006.01)
*B65G 1/137* (2006.01)
(Continued)

(52) U.S. Cl.
CPC .............. *B65G 1/137* (2013.01); *B07C 3/087* (2013.01); *B65H 1/027* (2013.01); *B65H 5/006* (2013.01);
(Continued)

(58) Field of Classification Search
CPC ........ B65G 1/137; B65G 47/24; B65H 15/02; B65H 5/006; B65H 1/027; B65H 29/02;
(Continued)

(56) References Cited

U.S. PATENT DOCUMENTS 5,271,710 A * 12/1993 Decharran .............. B07C 1/025
414/421
5,906,468 A * 5/1999 Vander Syde .......... B07C 1/025
414/403
(Continued)

FOREIGN PATENT DOCUMENTS

DE          2706331      6/1993
DE    10 2012 219 912   4/2014
WO       WO 99/20530    4/1999

OTHER PUBLICATIONS

International Search Report and Written Opinion dated Dec. 11, 2018 in International Application No. PCT/US2018/049762.

*Primary Examiner* — Lynn E Schwenning
(74) *Attorney, Agent, or Firm* — Knobbe Martens Olson & Bear LLP

(57) ABSTRACT

An automated system for transferring articles from a container. An item transfer system includes retainers configured to secure a first tray and a second tray, a movable paddle assembly, a frame, and a plurality of actuators. The system is configured to transfer articles from the first tray to the second tray by an automated process including securing the articles within the first tray with the paddle assembly, rotating the frame by approximately 90° to 100°, moving the paddle assembly in a series of linear translations to remove the items from the first tray and place the items into the second tray, rotating the frame back to its initial orientation, and releasing the items into the second tray.

20 Claims, 33 Drawing Sheets

Related U.S. Application Data on Oct. 23, 2017, provisional application No. 62/632,939, filed on Feb. 20, 2018.

(51) Int. Cl.
| | |
|---|---|
| *B65H 15/02* | (2006.01) |
| *B65H 5/00* | (2006.01) |
| *B65H 1/02* | (2006.01) |
| *B65H 29/02* | (2006.01) |

(52) U.S. Cl.
CPC ............. *B65H 15/02* (2013.01); *B65H 29/02* (2013.01); *B65H 2301/42242* (2013.01); *B65H 2301/422542* (2013.01); *B65H 2301/422548* (2013.01); *B65H 2701/1916* (2013.01)

(58) Field of Classification Search
CPC ......... B65H 2301/422542; B65H 2301/42242; B65H 2701/1916; B65H 2301/422548; B07C 3/087

See application file for complete search history.

(56) References Cited

U.S. PATENT DOCUMENTS

| | | | | |
|---|---|---|---|---|
| 6,217,274 | B1* | 4/2001 | Svyatsky | B65H 1/025 198/408 |
| 7,553,119 | B2* | 6/2009 | Good | B07C 1/00 271/2 |
| 7,572,094 | B2* | 8/2009 | Miskiewicz | B65H 15/02 414/416.03 |
| 7,866,936 | B2 | 1/2011 | Schuck et al. | |
| 8,141,133 | B2* | 3/2012 | Pagan | H04L 51/04 713/182 |
| 8,142,133 | B2* | 3/2012 | Neebe | B07C 3/00 414/796 |
| 8,172,498 | B2* | 5/2012 | Enenkel | B07C 1/025 414/416.01 |
| 2010/0290867 | A1* | 11/2010 | Nice | B07C 1/02 414/222.01 |
| 2013/0247524 | A1* | 9/2013 | Ford | B65B 69/00 53/492 |

* cited by examiner

SYSTEM FOR TRANSFERRING ARTICLES FROM A CONTAINER

CROSS-REFERENCE TO RELATED APPLICATIONS

This application claims the benefit of U.S. Provisional Application Ser. No. 62/556,233, filed Sep. 8, 2017, entitled "AUTOMATED SYSTEM FOR TRANSFERRING ARTICLES FROM A CONTAINER," U.S. Provisional Application Ser. No. 62/575,737, filed Oct. 23, 2017, entitled "SYSTEM FOR TRANSFERRING ARTICLES FROM A CONTAINER," and U.S. Provisional Application Ser. No. 62/632,939, filed Feb. 20, 2018, entitled "SYSTEM FOR TRANSFERRING ARTICLES FROM A CONTAINER," all of which are hereby incorporated by reference in their entirety and for all purposes.

FIELD

This disclosure relates to systems and methods for transfer of items between a first tray and a second tray.

DESCRIPTION OF THE RELATED TECHNOLOGY

Items, such as letters, envelopes, postcards, etc., may be received, transported, transferred, processed, collected, sorted, or the like, in containers such as trays. Items may be contained in different types of trays at various stages of transport and processing.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one aspect of the systems and methods disclosed herein, a tray content transfer system is described. The tray content transfer system comprises a frame configured to rotate about a rotation axis between an upright orientation and a rotated orientation; a first retainer coupled to the frame and configured to secure a first tray within the tray content transfer system, the first tray containing one or more items; a second retainer coupled to the frame and configured to secure a second tray within the tray content transfer system at a location spaced from the first tray along a longitudinal axis parallel to the rotation axis; a paddle assembly movably coupled to the frame, the paddle assembly comprising a plurality of paddles, wherein the distance between the paddles is adjustable to selectively engage and release items at least partially disposed between the paddles, and wherein the paddle assembly is movable relative to the frame along a first linear axis parallel to the longitudinal axis and a second linear axis perpendicular to the first linear axis; and a plurality of motors configured to adjust the distance between the paddles, to move the paddle assembly along the first linear axis and the second linear axis, and to rotate the frame about the rotation axis, in a predetermined sequence to transfer the one or more items from the first tray to the second tray.

In some embodiments, the predetermined sequence comprises, while the frame is in the upright orientation, causing the paddle assembly to engage the one or more items within the first tray; rotating the frame to the rotated orientation; moving the paddle assembly out of the first tray along the second linear axis; moving the paddle assembly along the first linear axis to a position proximate the second tray; moving the paddle assembly to a position at least partially within the second tray; rotating the frame to the upright orientation; and causing the paddle assembly to release the one or more items into the second tray. In some embodiments, the rotated orientation is rotated by at least 90° relative to the upright orientation. In some embodiments, the paddle assembly comprises a back plate disposed perpendicular to and at least partially between the paddles such that the one or more items rest at least partially on the back plate when the frame is in the rotated orientation. In some embodiments, the paddle assembly comprises a plurality of slidably offset back plates, each back plate in a fixed position relative to one of the plurality of paddles. In some embodiments, the slidably offset back plates are at least partially overlapping such that the slidably offset back plates span substantially the entire distance between the plurality of paddles. In some embodiments, the rotated orientation is rotated by more than 90° relative to the upright orientation, the paddle assembly further comprising a top plate disposed perpendicular to the back plate and disposed perpendicular to and at least partially between the paddles, such the back plate and the top plate retain the one or more items within the paddle assembly when the frame is in the rotated orientation. In some embodiments, the first retainer comprises at least one end pusher configured to space the one or more items from an inner wall of the first tray. In some embodiments, the end pushers are configured to simultaneously secure the first tray relative to the frame and to space the one or more items from the inner wall by moving inwardly through openings in side walls of the first tray. In some embodiments, the tray content transfer system further comprises a conveyor coupled to the frame, the conveyor configured to move a first tray or a second tray along the frame parallel to the longitudinal axis while the frame is in the upright orientation. In some embodiments, the tray content transfer system further comprises a sensor configured to detect the presence of the first tray or the second tray within the tray content transfer system, wherein the plurality of motors are configured to initiate the predetermined sequence based at least in part on detecting the presence of the first tray or the second tray.

In another aspect of the systems and methods disclosed herein, a method for transferring items from a tray is described. The method comprises, by an automated process, securing a first tray containing one or more items at a first location within a tray content transfer system; securing a second tray within the tray content transfer system at a second location spaced along a longitudinal axis from the first location; securing the one or more items relative to the first tray; rotating the first tray and the second tray simultaneously about a rotation axis parallel to the longitudinal axis from an upright orientation to a rotated orientation; while the first tray and the second tray are in the rotated orientation, moving the one or more items out of the first tray, moving the one or more items parallel to the longitudinal axis to a position adjacent to the second tray, and moving the one or more items into the second tray; rotating the first tray and the second tray simultaneously about the rotation axis from the rotated orientation to the upright orientation; releasing the one or more items into the second tray; and releasing the first tray and the second tray.

In some embodiments, the rotated orientation is rotated by at least 90° relative to the upright orientation. In some embodiments, the method further comprises engaging the one or more items between a plurality of paddles, wherein the one or more items remain engaged between the plurality of paddles while the first tray and the second tray are in the rotated orientation. In some embodiments, the method further comprises resting the one or more items on a substantially horizontal surface while the first tray and the second tray are in the rotated orientation. In some embodiments, securing the first tray comprises fixing the first tray relative to a frame of the tray content transfer system, and securing the second tray comprises fixing the second tray relative to the frame. In some embodiments, rotating the first tray and the second tray comprises rotating the frame about the rotation axis relative to a ground surface. In some embodiments, the method is initiated based at least in part on a detection of the presence of the first tray or the second tray within the tray content transfer system. In some embodiments, the second tray is an automation-compatible tray and the first tray is not an automation-compatible tray.

In another aspect of the systems and methods disclosed herein, a tray content transfer apparatus is described. The tray content transfer apparatus comprises means for securing a first tray and a second tray within the tray content transfer apparatus, the first tray containing one or more items; means for engaging the one or more items within the first tray; means for simultaneously rotating the first tray and the second tray about a horizontal rotational axis between an upright orientation and a rotated orientation; means for, while the first tray and the second tray are in the rotated orientation, removing the one or more items from the first tray along a first horizontal path, moving the items to a position proximate the second tray along a second horizontal path to a position adjacent to the second tray, and moving the items into the second tray along a third horizontal path parallel to the first horizontal path; and means for, while the first tray and the second tray are in the upright orientation, releasing the one or more items into the second tray.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
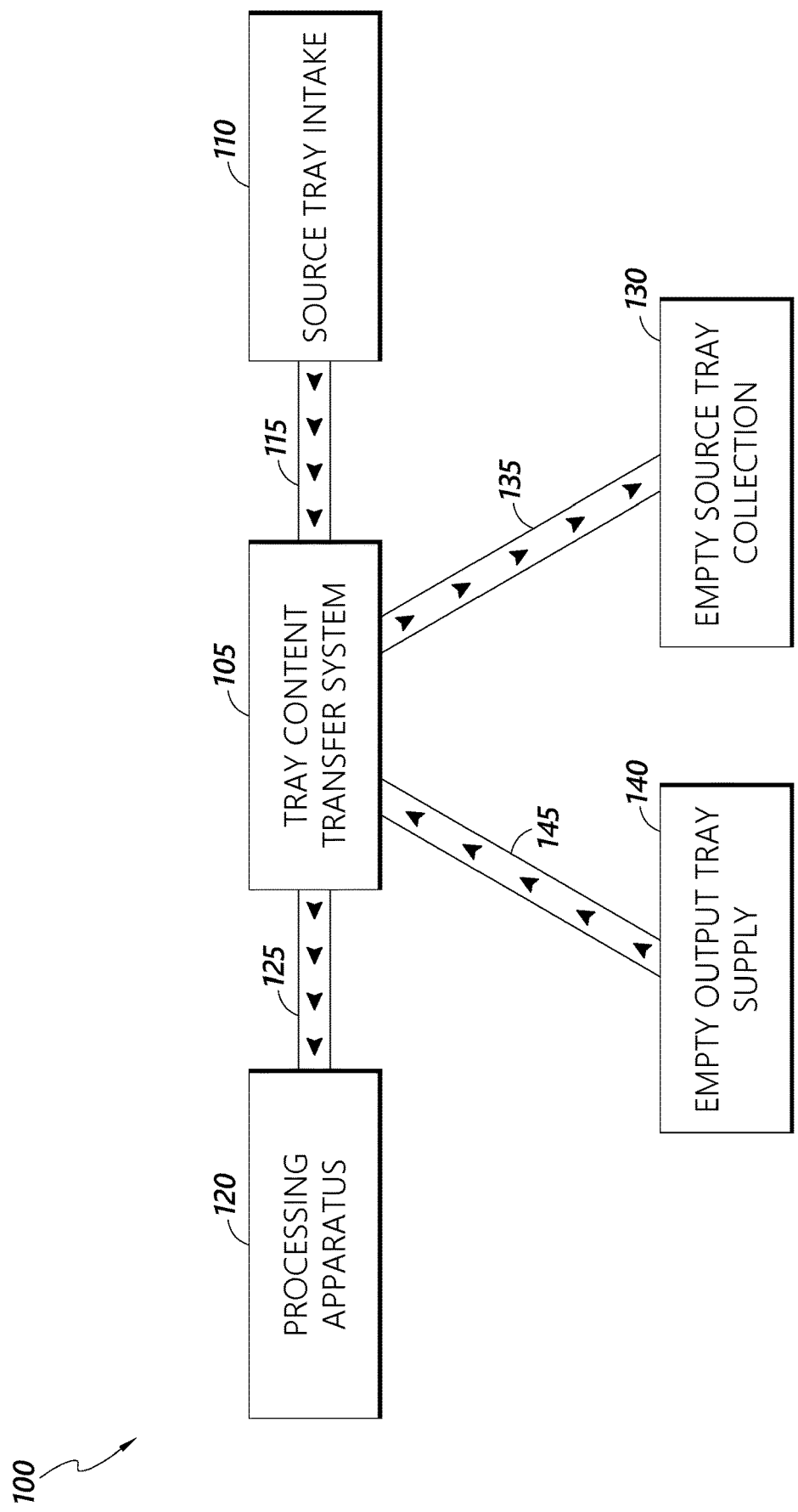
FIG. 1 is a schematic illustration of an exemplary item processing system including a tray content transfer system.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

In processing items in a distribution network, items can be transported in containers, such as trays. Items such as letters, postcards, envelopes, or other stackable items may be received, transported, and processed in trays. In some item processing implementations, two or more different types of trays may be used. For example, items may be received in a first type of tray which may be optimized for transport of items outside of a processing facility (e.g., may be flexible, lightweight, inexpensive to manufacture, sized and shaped to fit in an item collection system, or the like). When a tray of items is received at a processing facility, a second type of tray may be better suited for transport of the items within the facility for processing. For example, a second type of tray may be configured to be compatible with automated processing machinery at the processing facility (e.g., may have structural features designed to interact with particular processing machines and/or may be more rigid or dimensionally stable to facilitate automated processing of items). Thus, items received in the first type of tray may need to be transferred to the second type of tray before at least a portion of the desired processing occurs.

Transferring items between trays such as from soft-sided intake trays to rigid automation-friendly processing trays can be performed manually. Manual transfer of items from a first tray to a second tray can be time-consuming and imprecise. Items may be dropped while being manually transferred, for example, while an operator is moving a horizontally oriented stack of letters by exerting an inward pressure on the ends of the stack. In another example, items such as letters may be received in a uniformly faced arrangement, and operator error during transfer may cause some of the letters to face the opposite direction after transfer, resulting in processing errors or delays.

The tray content transfer systems disclosed herein are configured to provide an automated process for transferring items from a first tray to a second tray. In some embodiments, the tray content transfer systems may transfer items more reliably, efficiently, cost-effectively, and/or quickly than existing manual methods of tray content transfer. Although the present disclosure describes tray content transfer systems in the context of trays and flat items such as letter mail, it will be understood that other containers and items can be used without departing from the scope of the present disclosure.

Generally described, embodiments of the systems described herein use a combination of rotational and linear motion to reliably and efficiently transfer items between a source tray, such as a letter tray, and a process tray better suited for use with further processing of the items, such as a rigid tray. For example, the items may be transferred to an automation-compatible tray from a source tray that is not an automation-compatible tray. In some embodiments, a loaded source tray and an empty process tray are secured within a rotatable frame while the frame is in an upright orientation. A paddle assembly descends to a position partially within the loaded source tray, such that the contents of the source tray are between the paddles of the paddle assembly, and squeezes the paddles together to gently clasp or otherwise engage the contents. The frame then rotates approximately 90° to 100° to a rotated orientation such that the contents are resting on a rear surface of the paddle assembly and not on the bottom surface of the source tray. The paddle assembly then moves linearly out of the source tray, moves linearly to a position adjacent to the process tray, and moves linearly into the process tray such that the contents are generally within the process tray. The frame then rotates back to the upright orientation and the paddles are moved apart to release the contents into the process tray. The combination of rotational and linear motion can advantageously allow the transfer system to move articles such as letters from a first tray to a second tray without lifting or suspending the articles over a space between the trays, where articles may be lost if dropped.

FIG. 1 schematically illustrates an example item processing system 100 including a tray content transfer system 105. The item processing system 100 further includes a source tray intake 110, processing apparatus 120, an empty source tray collection 130, and an empty process tray supply 140. Trays can be transferred between the components of the item processing system 100 by an intake flow path 115, an output flow path 125, an empty source tray flow path 135, and an empty process tray flow path 145. Each of the flow paths 115, 125, 135, 145 can be a conveyor, such as a moving conveyor belt surface, a series of rollers, or any other conveying system configured to move one or more trays laterally and/or vertically.

The source tray intake 110 can include one or more devices or systems for providing item-containing source trays. For example, the source tray intake 110 can include a loading dock where item-containing trays are received from transport vehicles for processing. In some embodiments, the source tray intake 110 can be an output of another process to be performed before tray content transfer. For example, in some letter mail processing embodiments, the source tray intake 110 may include a facer-canceler system configured to apply a cancellation to letters and place the letters in a uniformly faced horizontal stack within source trays.

The processing apparatus 120 can include one or more devices or systems for processing the items after tray content transfer. For example, the processing apparatus 120 can include any number of machines configured to scan, weigh, measure, sort, order, combine, separate, analyze, or otherwise process the items. In some letter mail processing embodiments, the processing apparatus 120 can include one or more machines for automatically reading information provided on the letters (e.g., postage information, destination address, return address, etc.) and/or sorting the letters for further transportation.

The empty source tray collection 130 and empty process tray supply can include one or more lines, piles, stacks, carts, dispensers, receivers, or other structures capable of holding a plurality of trays. For example, the empty source tray collection 130 may include a tray receiving system located at an end of the empty source tray flow path 135 for receiving and stacking or otherwise organizing empty source trays to be reused for transporting additional items. The empty process tray supply 140 can include one or more stacks, dispensers, or the like, for placing empty process trays into the empty process tray flow path 145 for delivery to the tray content transfer system 105.

In an exemplary method of operation, the tray content transfer system 105 receives an item-containing source tray from the source tray intake 110 via the intake flow path 115, and receives an empty process tray from the empty process tray supply 140 via the empty process tray flow path 145. At the tray content transfer system 105, the items in the source tray are transferred from the source tray to the empty process tray. After the transfer, the process tray contains the items previously received in the source tray. The item-containing process tray is then sent to the processing apparatus 120 via the output flow path 125. The empty source tray is sent to the empty source tray collection 130 via the empty source tray flow path 135. After the source tray and process tray leave the tray content transfer system 105, the example method can be repeated with a second item-containing source tray and a second empty process tray.

The exemplary method described above with reference to FIG. 1 can be repeated any number of times or indefinitely, for example, based on a desired number or rate of item-containing source trays received for processing. In some embodiments, the tray content transfer system 105 can be configured to transfer the contents of two or more source trays to a single process tray, to transfer the contents of a single source tray to two or more process trays, or to transfer the contents of two or more source trays to two or more process trays simultaneously. In addition, various components of the item processing system 100 can be automated and/or performed manually. For example, any of the flow paths 115, 125, 135, 145 can be performed manually at least in part, such as by an operator manually placing one or more loaded or empty trays onto a conveyor or directly into the tray content transfer system 105.

Figure 2A:
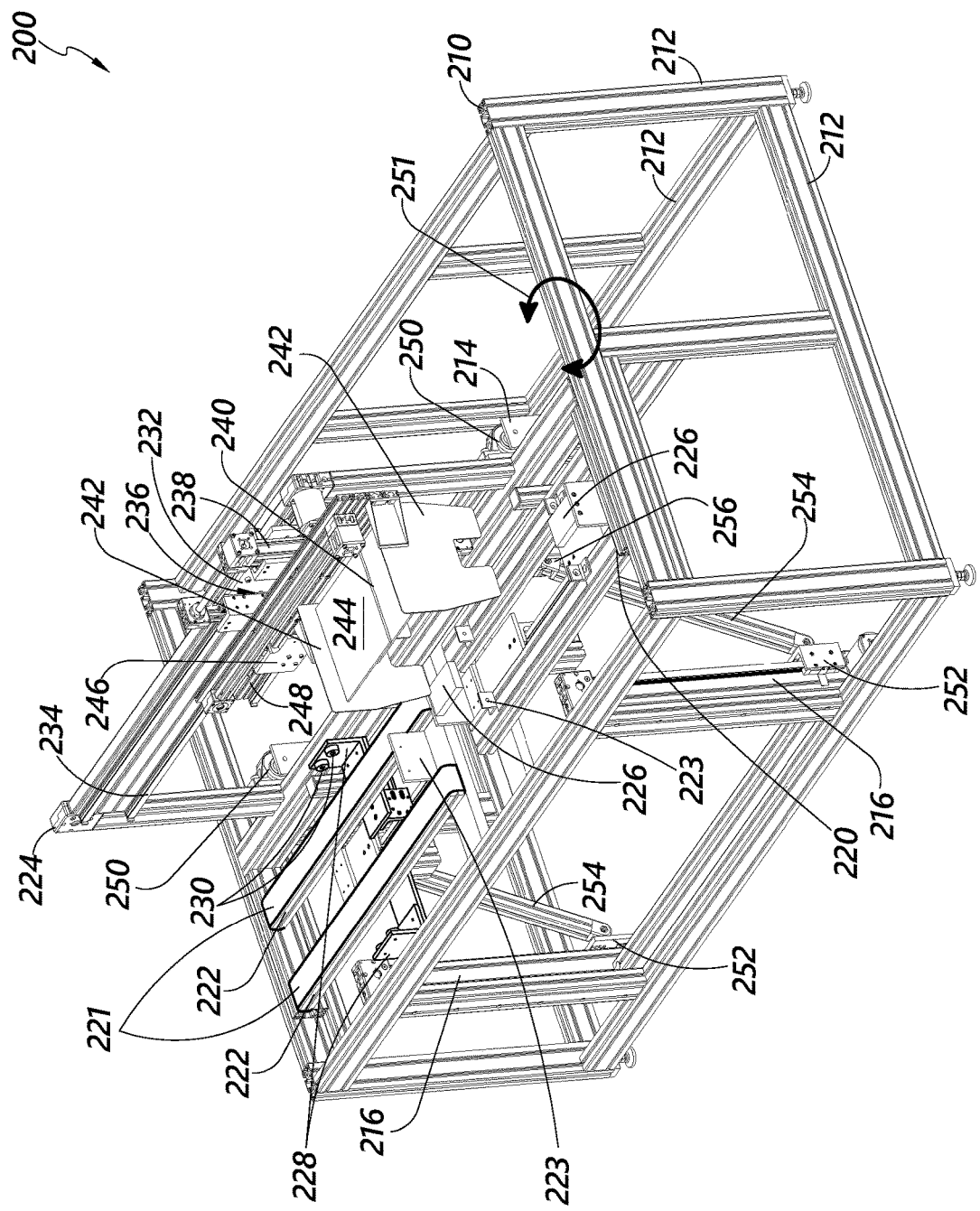
FIG. 2A is a front perspective view of an exemplary tray content transfer system.
Figure 2B:
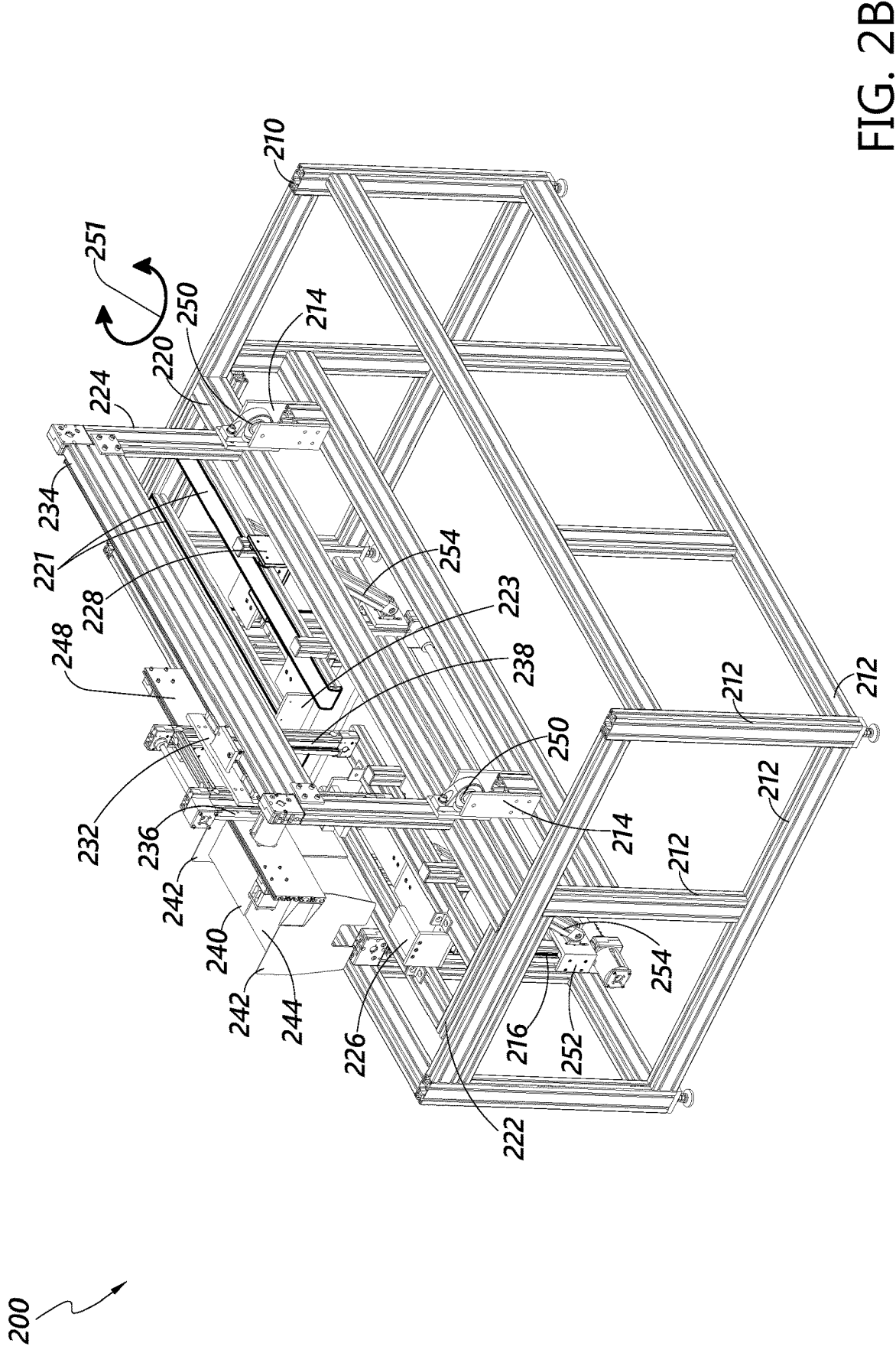
FIG. 2B is a rear perspective view of the tray content transfer system of FIG. 2A.
Figure 2C:
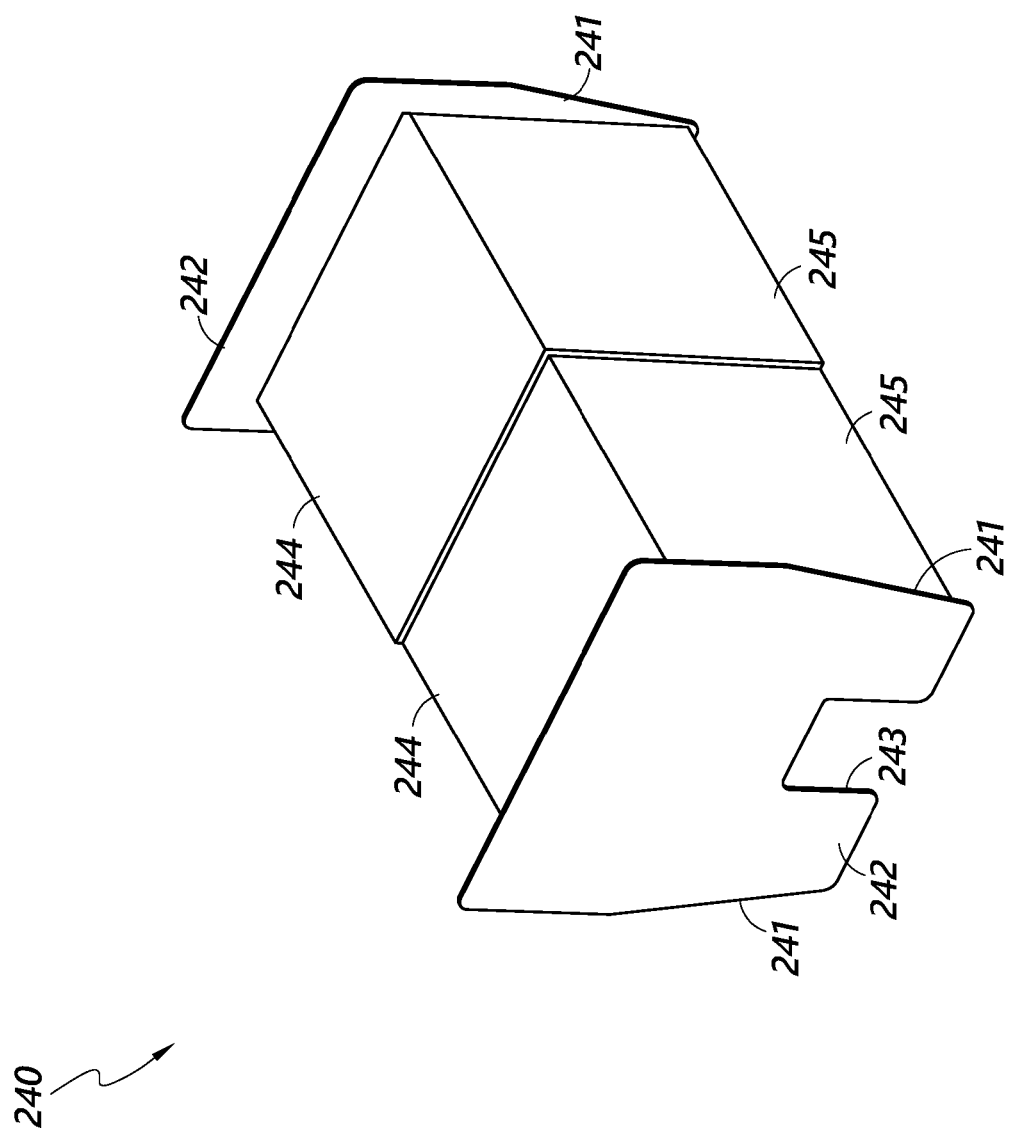
FIG. 2C is a perspective view of a paddle assembly component of the tray content transfer system depicted in FIGS. 2A and 2B.
Figure 2D:
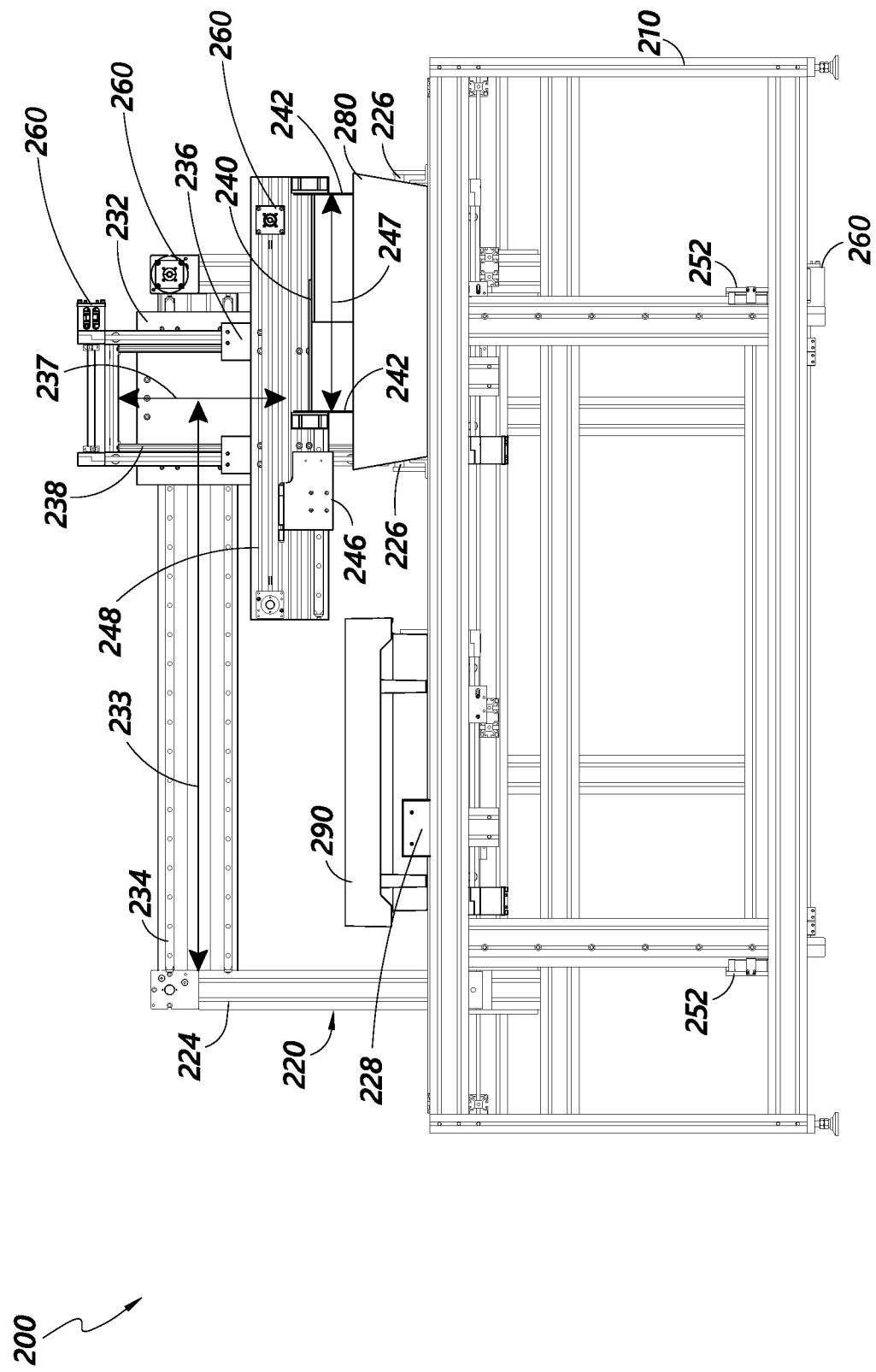
FIG. 2D is a front elevation view of the tray content transfer system of FIGS. 2A and 2B showing the axes of motion of the tray content transfer system.

FIGS. 2A-2D depict a tray content transfer system 200 in accordance with an exemplary embodiment. FIGS. 2A and 2B are front and rear perspective views of the tray content transfer system 200 in an empty state. FIG. 2C is a rear perspective view of a paddle assembly 240, a component of the tray content transfer system 200. FIG. 2D is a front elevation view of the tray content transfer system 200 containing a source tray 280 and a process tray 290, illustrating three axes of motion within the tray content transfer system 200. The tray content transfer system 200 generally includes an outer frame 210, a rotation frame 220 movably mounted at least partially within the outer frame 210, and the paddle assembly 240 movably mounted on the rotation frame 220.

The outer frame 210 is generally configured to provide a stable support for the rotation frame 220. The outer frame 210 includes various structural members 212 arranged to form a substantially rigid frame structure, two pivot points 214, and two vertical tracks 216. As will be described with reference to the rotation frame 220, the pivot points 214 and the vertical tracks 216 are configured to accommodate and/or at least partially actuate rotational motion of the rotation frame 220 about a rotation axis defined by the two pivot points 214. In various embodiments, the outer frame 210 can be any size, shape, or configuration suitable to support the rotation frame 220. For example, the outer frame 210 can be built into a wall, a shelf, a floor, or the like, and need not be a free-standing rectangular frame as shown in the figures.

The rotation frame 220 includes a horizontal sub-frame 222 and a vertical sub-frame 224 rigidly and perpendicularly mounted to the horizontal sub-frame 222. The horizontal sub-frame 222 is configured to receive and secure a source tray 280 and a process tray 290, as will be described herein below with reference to FIG. 2D. Two slidable end pushers 226 are mounted in a spaced configuration on the horizontal sub-frame 222 to act as a retainer for a source tray 280, such that a source tray, for example, a plastic postal tray, can be placed between the end pushers 226 and secured to the horizontal sub-frame 222 by sliding the end pushers 226 inward such that the end-pushers 226 extend through holes in the sidewalls of the source tray 280. The inner ends of the end-pushers 226 can be squared, or may be rounded, chamfered, beveled, filleted, bullet-shaped, or otherwise shaped so as to facilitate entry of the end pushers 226 into the holes of source trays 280, for example, to accommodate incorrect alignment of a source tray 280 with the end pushers 226. In some embodiments, the end pushers 226 may be external clamps that do not pass through holes in the source tray 280. Brackets 223 may be provided to facilitate horizontal alignment of the trays. Actuators may be provided within the system 200 (e.g., attached to the horizontal sub-frame 222) to move the end pushers 226.

Process tray clamps 228 are provided as a retainer for securing a process tray 290 to the horizontal sub-frame 222. The process tray clamps 228 further include compressible feet 230 (e.g., rubber discs or the like), and are mounted in a spaced configuration on the horizontal sub-frame 222 such that a process tray 290, for example, a rigid automation-friendly processing tray, can be placed between the process tray clamps 228 and secured to the horizontal sub-frame 222 by sliding the process tray clamps 228 inward until they contact opposing sides of the process tray 290. The compressible feet 230 can provide an inward pressure and static friction against opposite sides of the process tray 290 to hold the process tray 290 in place. Actuators may be provided within the system 200 (e.g., attached to the horizontal sub-frame 222) to move the process tray clamps 228. In some embodiments, one or more conveyors 221 are located on or near the horizontal sub-frame 222 and configured to slide a process tray 290 when the process tray 290 is located at least partially on the conveyors 221. The conveyors 221 may be reversible, for example, so that they can travel in a first direction before a transfer to pull a process tray 290 from an external conveyor system (e.g., an automated tray transport system or the like) into a suitable position between the process tray clamps 228, and can travel in a second direction after completing a transfer to push the process tray 290 back out to the external conveyor system. It will be understood that one or more additional conveyors similar to conveyors 221 may similarly be implemented for source trays 280.

The vertical sub-frame 224 of the rotation frame 220 is generally configured to support and move the paddle assembly 240. A horizontal translation platform 232 is slidably mounted to a horizontal track member 234 of the vertical sub-frame 224 to accommodate horizontal movement of the paddle assembly 240. A vertical translation platform 236 is slidably mounted to two vertical track members 238 of the horizontal translation platform 232 to accommodate vertical movement of the paddle assembly 240. Movement of the horizontal translation platform 232 along the horizontal track member 234 and movement of the vertical translation platform 236 along the vertical track members 238 can occur independently, and may be controlled by one or more motors.

The rotation frame 220 is configured to rotate relative to the outer frame 210 as indicated by arrow 251 in FIGS. 2A and 2B. Thus, the rotation frame 220 further includes two rotation hinges 250 and two vertical sliders 252 connected to the horizontal sub-frame 222 by legs 254 coupled to the horizontal sub-frame 222 at leg hinges 256. When the rotation frame 220 is to be rotated, the vertical sliders 252 can be driven upward along the vertical tracks 216, for example, by one or more motors, applying a generally upward force on the horizontal sub-frame 222. The generally upward force on the horizontal sub-frame 222 causes a torque at the axis of rotation along the pivot points 214, such that the rotation frame 220 rotates backward (e.g., clockwise in the perspective view of FIG. 2A) about the axis of rotation. The hinges 250 interlock with the pivot points 214 to secure the rotation frame 220 to the outer frame 210 along the axis of rotation. The rotation frame 220 may have a maximum range of rotational motion, for example, defined between the positions of the rotation frame 220 when the vertical sliders 252 are at the bottom and top ends of the vertical tracks 216.

The paddle assembly 240, as shown in FIGS. 2A-2C, includes two paddles 242, top plates 244, and back plates 245. The paddle assembly 240 can be made of any substantially rigid material, for example, a metal such as sheet aluminum or steel, a hard plastic, or the like. In some embodiments, at least a portion of the paddle assembly 240, for example, top plates 244 and/or back plates 245, may comprise a less rigid material such as cardboard, corrugated plastic, or the like. In the example embodiment depicted in FIGS. 2A-2D, each top plate 244 is adjacent to and overlapping the other top plate 244, and each back plate 245 is adjacent to and overlapping the other back plate 245, such that the top plates 244 and back plates 245 can remain in contact and span substantially the entire distance between the paddles 242 as the paddles 242 slide together or apart.

A paddle slider 246 is slidably mounted to a paddle assembly track member 248 of the vertical translation platform 236. The paddle slider 246 is rigidly coupled to one of the paddles 242, such that motion of the paddle slider 246 along the paddle assembly track member 248 causes the paddle 242 to move inward or outward relative to the other paddle 242. In some embodiments, both paddles 242 can be movable inward and outward, or one of the paddles 242 can be stationary with the distance between the paddles adjusted by moving a single paddle 242 relative to the other paddle 242.

Each paddle 242 is a generally planar surface disposed perpendicular to the top plates 244 and back plates 245. The paddles 242 include angled edges 241, providing a reduced paddle width at the lower end of the paddles 242 to facilitate placement of the paddle into a tray. For example, in embodiments compatible with corrugated plastic postal letter trays as source trays 280, the angled edges 241 may be configured to substantially match the angle of the sidewalls of the letter trays. Each paddle 242 further includes a cutout 243 extending upward from a bottom edge of the paddle 242. The cutout 243 has a width slightly larger than the width of the end pushers 226 of the rotation frame 220, such that an end pusher 226 can be accommodated within the cutout 243 and avoid impeding downward motion of the paddle 242 when the paddle 242 is lowered into a source tray 280. In various embodiments, the paddles 242 can have other sizes and/or shapes to conform with source trays 280 of any size or shape.

Referring now to FIG. 2D, the components described above with reference to FIGS. 2A-2C can move the paddles 242 of the paddle assembly 240 along several axes within the reference frame of the rotation frame 220. Horizontal translation along an axis 233 of the paddle assembly 240 can be achieved by moving the horizontal translation platform 232 along the horizontal track member 234. Vertical translation along an axis 237 of the paddle assembly 240 can be achieved by moving the vertical translation platform 236 along the vertical track members 238. Squeezing of the paddles 242 along an axis 247 can be achieved by moving the paddle slider 246 along the paddle assembly track member 248. A combination of movements along axes 233, 237, and 247 can be used to transfer items from the source tray 280 to the process tray 290.

Referring generally to FIGS. 2A-2D, motion of any of the moving parts described herein, for example, end pushers 226, process tray clamps 228, horizontal translation along the axis 233, vertical translation along the axis 237, squeezing of the paddles 242 along the axis 247, and/or rotation of the rotation frame 220 within the outer frame, can be driven by any number of motors 260, and can be selectively controlled and/or inhibited by mechanical brakes configured to stop and/or prevent motion along any of the movement axes described herein. The motors 260 and/or brakes can be controlled by one or more controllers, which may include computer components such as one or more processors, memory or other storage media, network or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence. The predetermined sequence can include, for example, a tray content transfer process such as the process described below with reference to FIGS. 3-14.

FIGS. 3-14 sequentially illustrate an example process for transferring the contents of a source tray 280 to a process tray 290. Although the process of FIGS. 3-14 is shown and described in the context of the tray content transfer system 200 depicted in FIGS. 2A-2D, it will be appreciated that the same or similar steps may be implemented in any other tray content transfer system.

Figure 3:
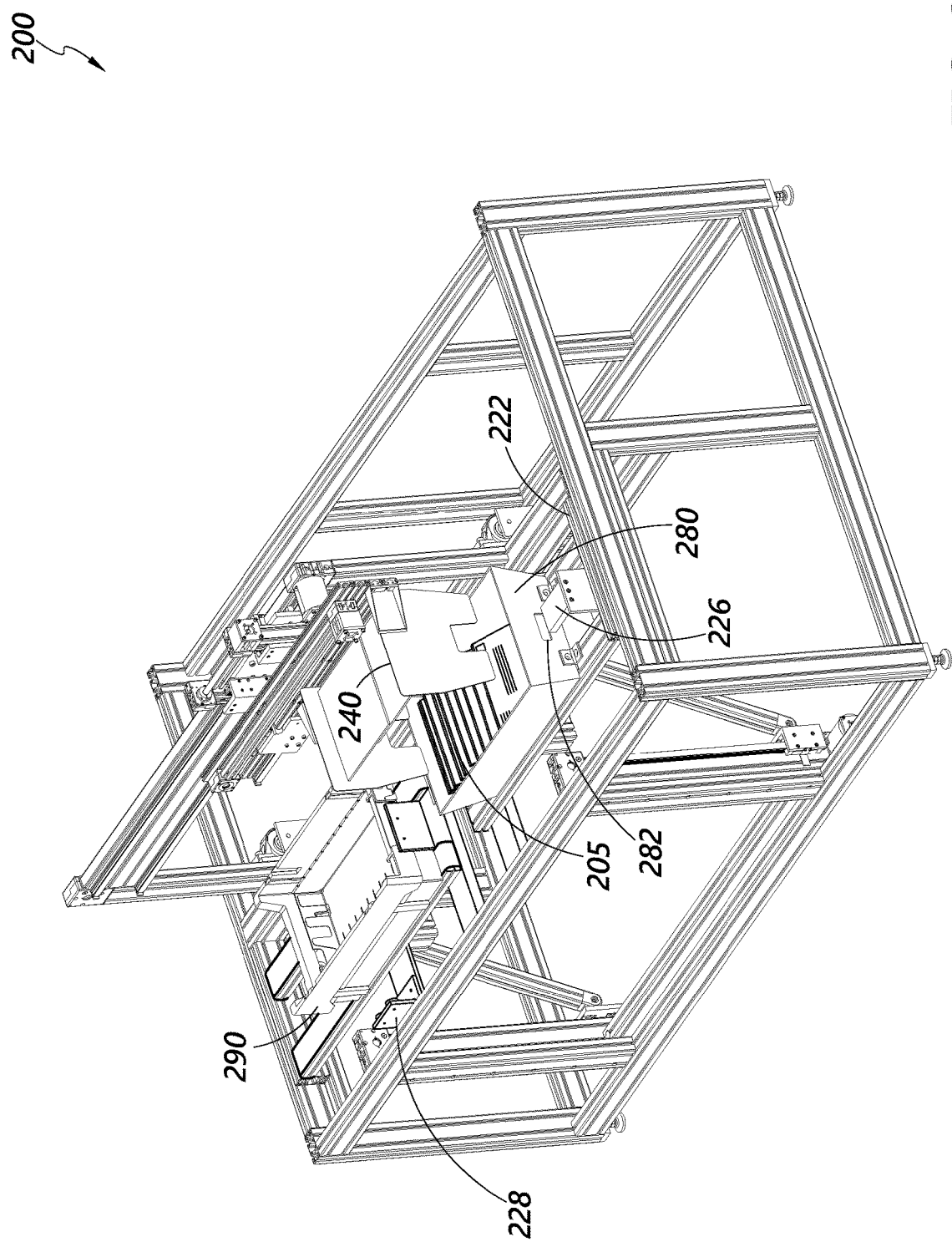
FIG. 3 is a perspective view of an initial state of a tray content transfer system during an exemplary tray content transfer process.

FIG. 3 depicts an initial state of the tray content transfer process. In the initial state, a source tray 280 contains items 205. The items can be, for example, letters, flats, etc. In the initial state of FIG. 3, the source tray 280 has been placed onto the horizontal sub-frame 222 of the rotation frame 220 between the end pushers 226, which are in an open configuration. An empty process tray 290 has been placed in the horizontal sub-frame 222 between the process tray clamps 228, which are in an open configuration. As described above with reference to FIG. 1, the source tray 280 and the process tray 290 may have been placed in their respective locations manually or automatically, for example, being placed into the tray content transfer system 200 by one or more conveyors, rollers, ramps, robotic arms, paddles, pushers, or other automated tray placement mechanism. The paddle assembly 240 is located above the source tray 280 with the paddles in an open configuration. The rotation frame 220 is in an upright configuration.

In the example tray content transfer process, the source tray 280 is a corrugated plastic postal letter tray for the transportation of letter mail. The process tray 290 is a rigid plastic automation-friendly tray including various features optimized for transfer of the items 205 between various letter processing machinery located elsewhere. The items 205 stacked within the source tray 280 are to be transferred to the process tray 290. In some embodiments, the items 205 may already be uniformly faced (that is, selectively flipped such that the postage and address of each item in the stack faces the same direction). Thus, it is desirable for the tray content transfer process to maintain the uniform facing of the items 205 during transfer.

Figure 4:
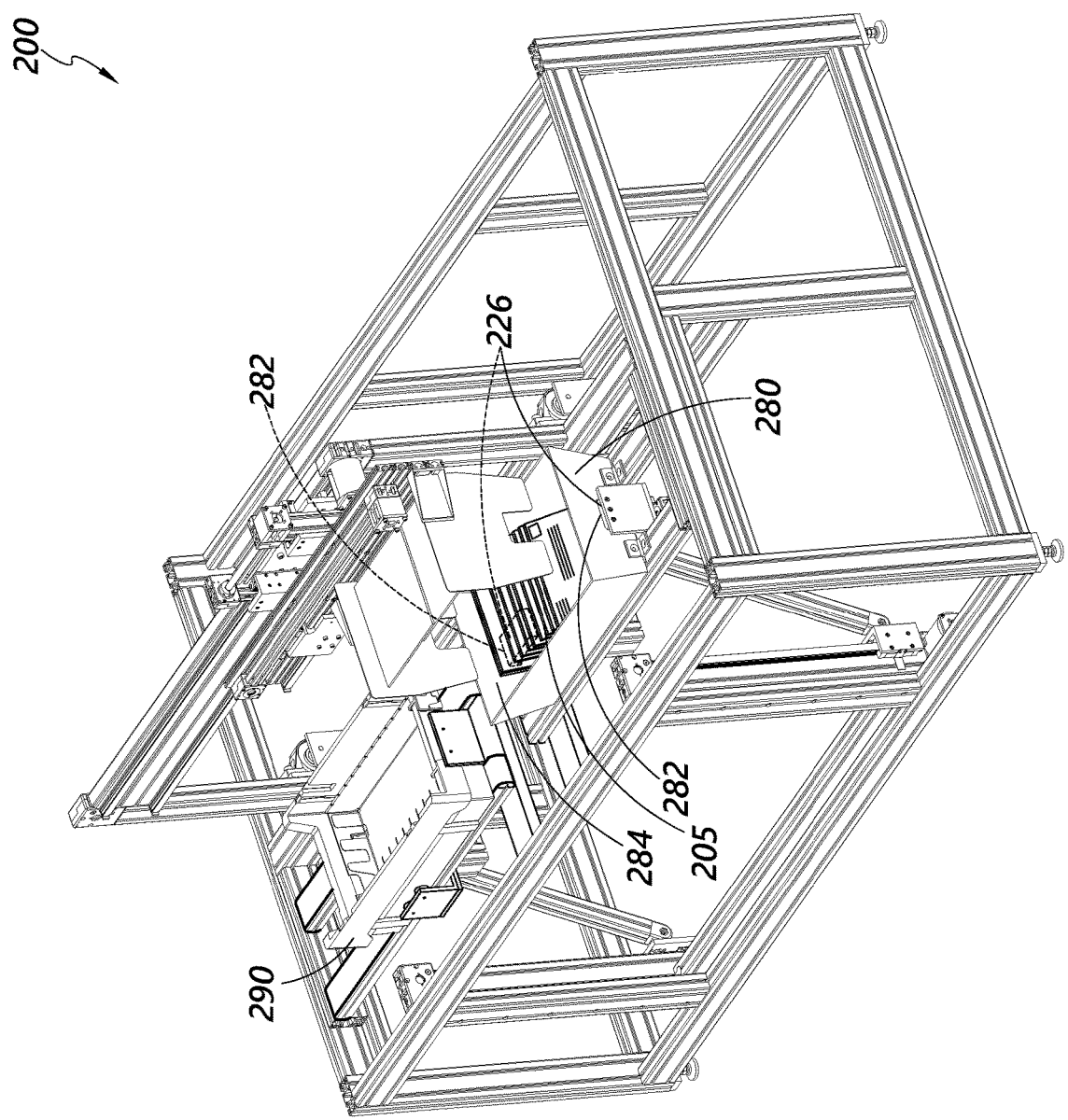
FIG. 4 is a perspective view of a second state of the tray content transfer system of FIG. 3 during the exemplary tray content transfer process of FIG. 3.

Referring now to FIG. 4, after the source tray 280 and the process tray 290 have been placed into the tray content transfer system 200, the end pushers 226 move inward through holes 282 in the ends of the source tray 280, such that a portion of each end pusher 226 extends into the interior space of the source tray 280. At an intermediate point along the inward trajectory of the end pushers 226, they contact the stack of items 205. With continued inward motion, the end pushers 226 can compress the stack of items 205, causing the items 205 to move to a more vertical orientation. In compressing the stack, the end pushers 226 push the items 205 toward the middle of the source tray 280 and away from the ends, creating a space between the items 205 and the interior end walls 284 of the source tray 280. In various embodiments, the inward distance traveled by each end pusher 226 can be, for example, 1 inch, 2 inches, 3 inches, 4 inches, or more.

In addition, the process tray clamps 228 move inward against the process tray 290 to secure the process tray 290 in position.

Figure 5:
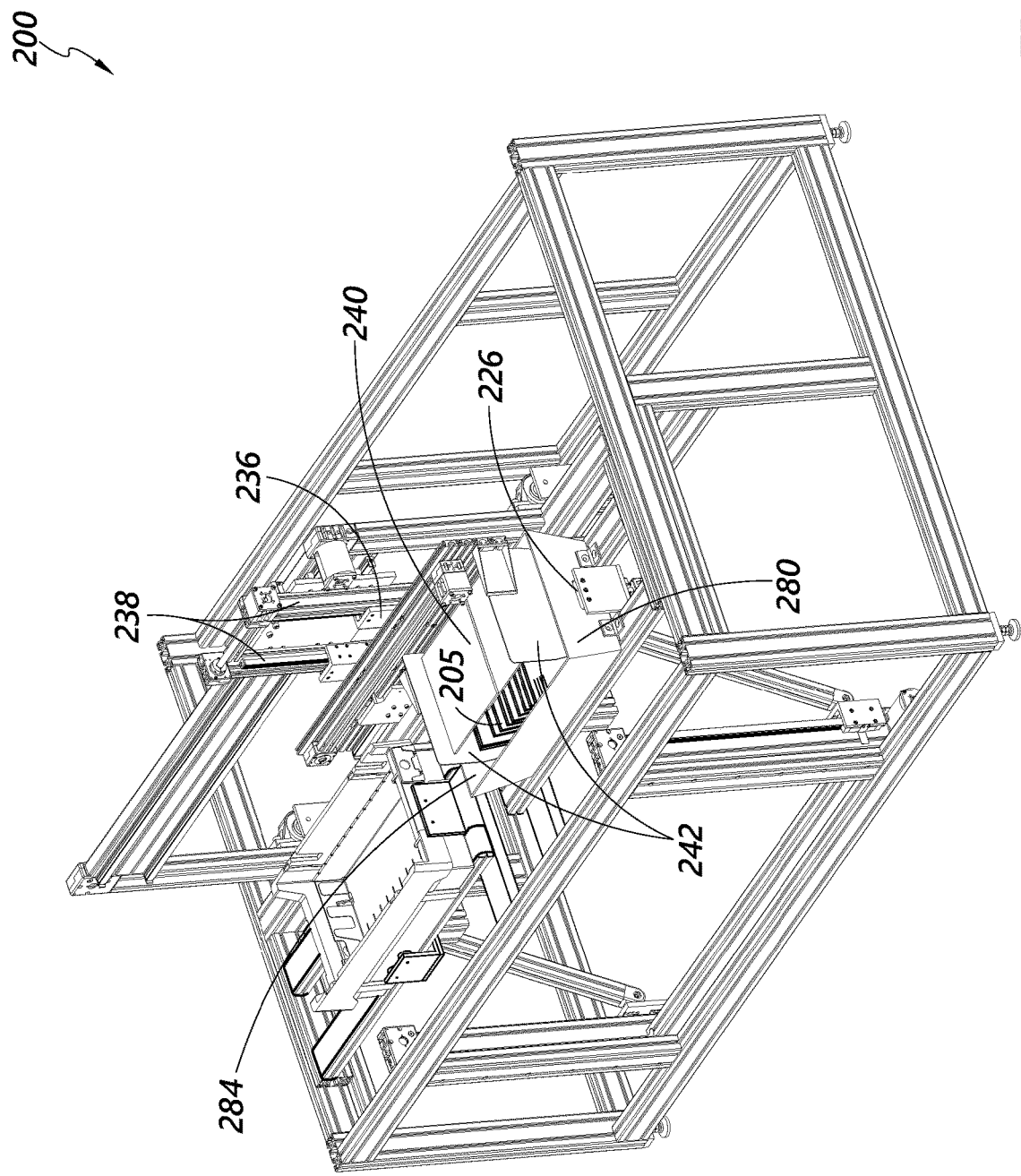
FIG. 5 is a perspective view of a third state of the tray content transfer system of FIG. 3 during the exemplary tray content transfer process of FIGS. 3-4.

After the end pushers 226 are inserted, the process continues to the configuration shown in FIG. 5. As shown in FIG. 5, the vertical translation platform 236 slides downward along the axis 237, along the vertical track members 238 such that the paddle assembly 240 moves downward along the axis 237 to a location partially within the source tray 280. The paddles 242 of the paddle assembly 240 are spaced such that each paddle 242 descends into one of the empty spaces between the items 205 and an interior end wall 284 of the source tray 280. The end pushers 226 are accommodated within the cutouts 243 (shown in FIG. 2C) of the paddles 242 such that lower ends of the paddles 242 can descend to a position at or near the bottom of the source tray 280 (e.g., within 1 inch, ½ inch, ¼ inch, or closer). Thus, in the state shown in FIG. 5, the stack of items 205 is disposed between the two paddles 242.

Figure 6:
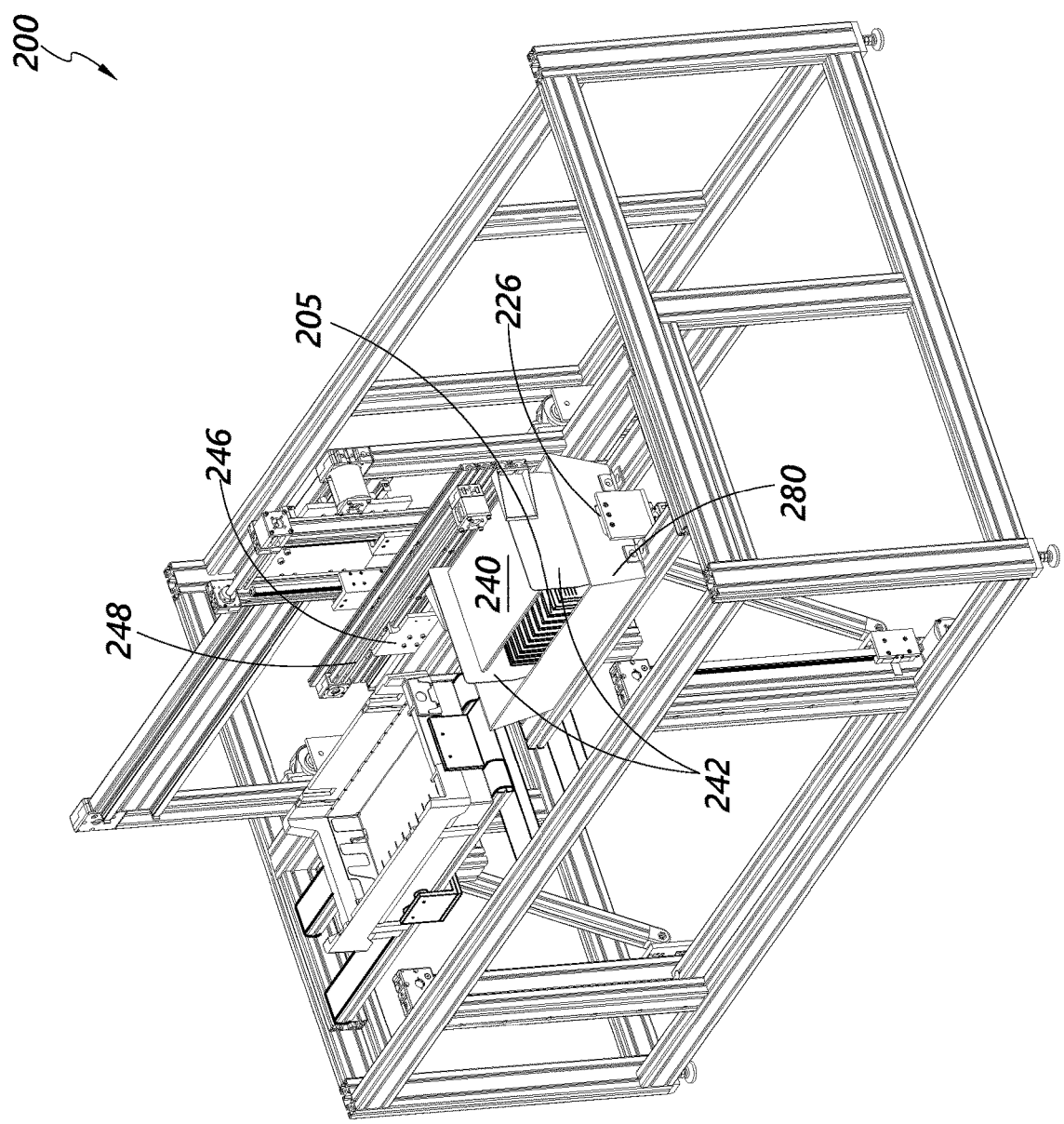
FIG. 6 is a perspective view of a fourth state of the tray content transfer system of FIG. 3 during the exemplary tray content transfer process of FIGS. 3-5.

After the paddle assembly 240 is lowered into the source tray 280, the process continues to the configuration shown in FIG. 6. As shown in FIG. 6, the paddle slider 246 has moved inward along the axis 247 along the paddle assembly track member 248 such that the top plates 244 slide over each other and at least one of the paddles 242 moves inward to squeeze the paddles 242 closer together. The paddles 242 can be moved together a suitable distance such that each paddle 242 is in contact with an end of the stack of items 205. In some embodiments, the end pushers 226 can move outward a short distance so as to reduce the inward pressure on the stack. In the state shown in FIG. 6, the items 205 are substantially confined between the paddles 242, the bottom of the source tray 280, and the top plates 244 and back plates 245 of the paddle assembly 240.

Figure 7A:
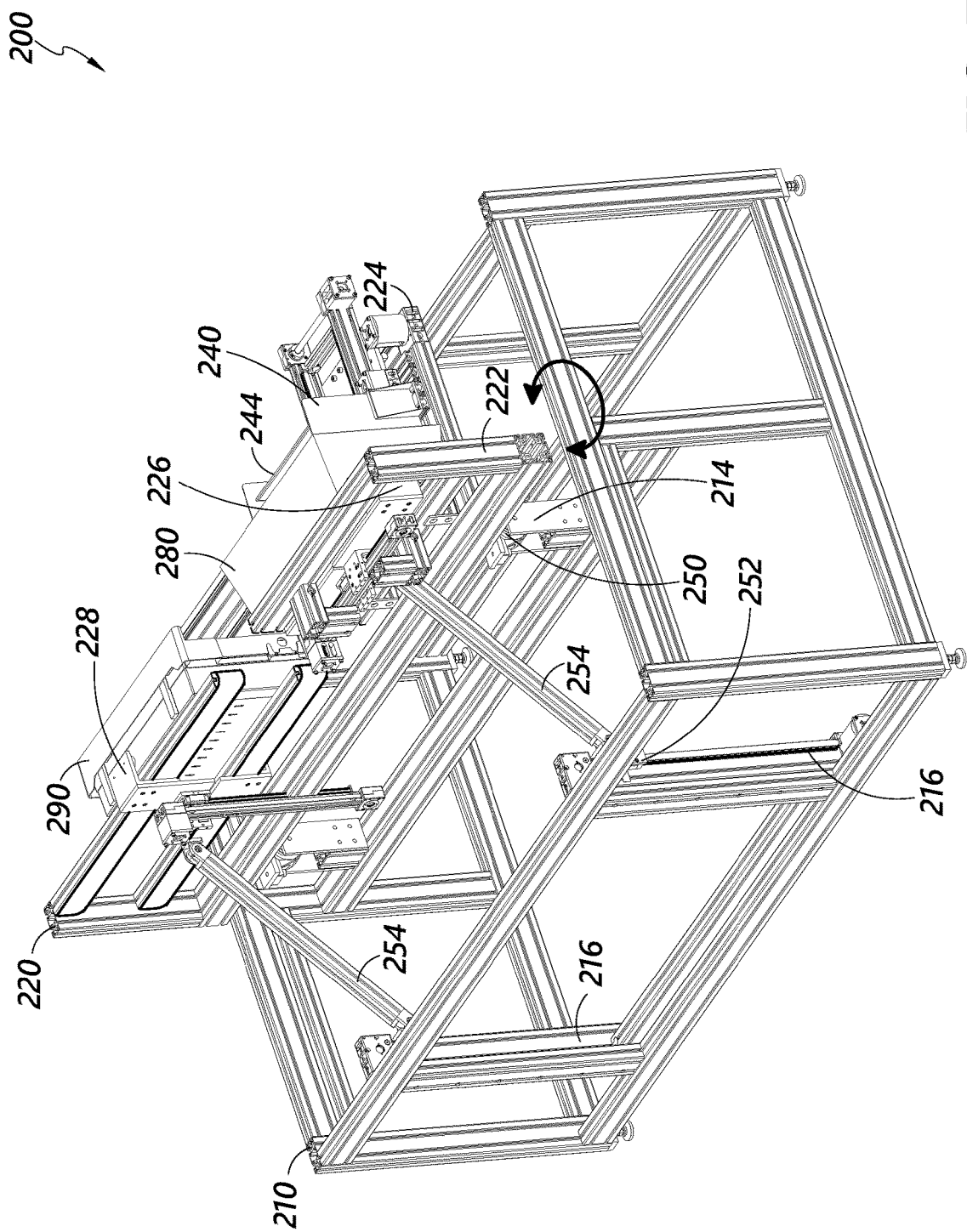
FIGS. 7A and 7B are perspective views of a fifth state of the tray content transfer system of FIG. 3 during the exemplary tray content transfer process of FIGS. 3-6.
Figure 7B:
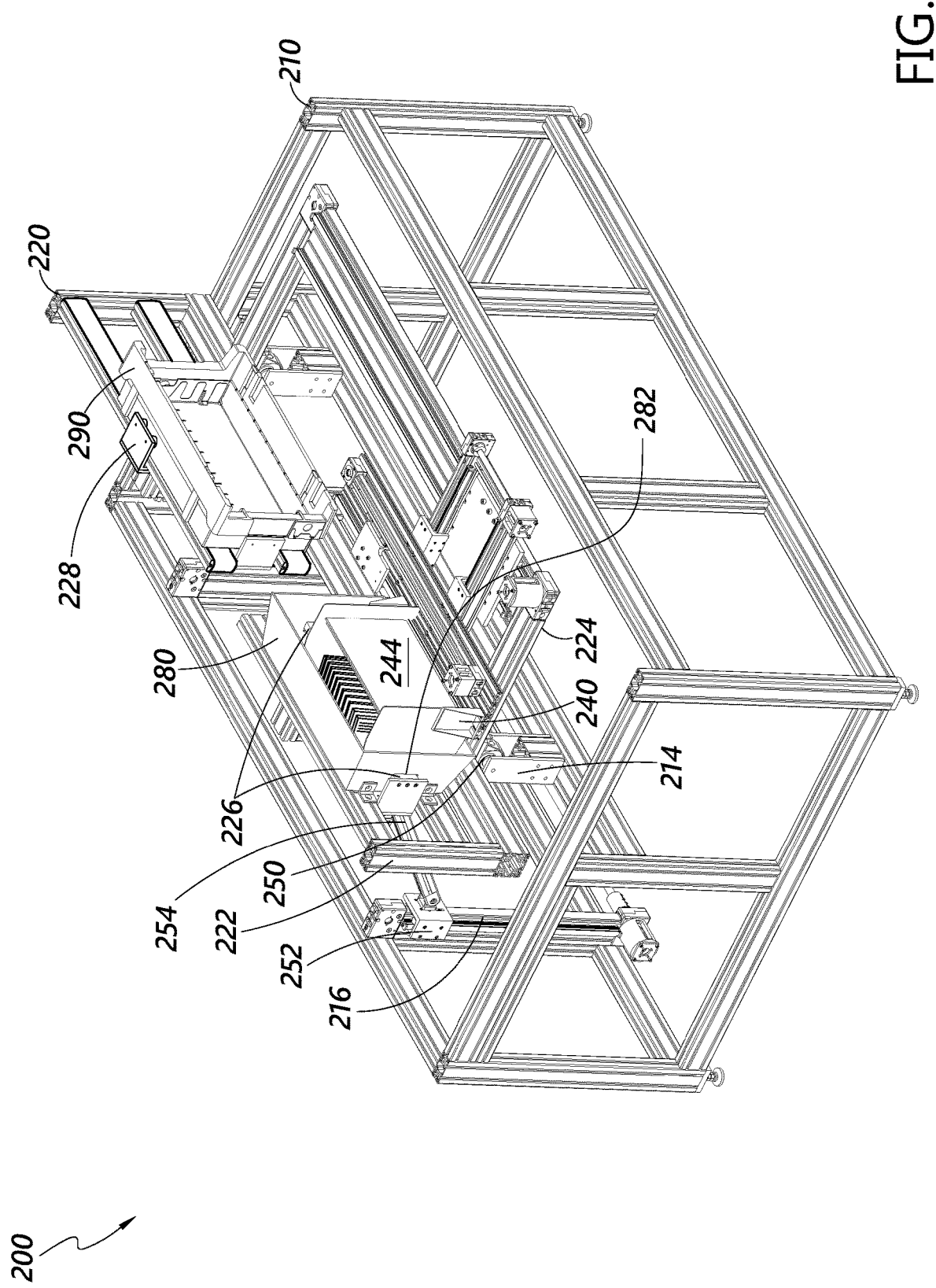

After the paddles 242 move inward to contain the stack of items 205, the process continues to the configuration shown in FIGS. 7A and 7B. As shown in FIGS. 7A and 7B, the entire rotation frame 220 has rotated backward about the axis of rotation between the hinges 250. In some embodiments, the rotation frame 220 rotates approximately 90° or more, for example, any angle within the range of approximately 95°, 100°, 105°, or more, such that the horizontal sub-frame 222 is in a generally vertical orientation (e.g., angled between approximately 70° and 90° relative to the outer frame 210 and/or the ground) and the vertical sub-frame 224 is in a generally horizontal orientation (e.g., angled between approximately 0° and 20° relative to the outer frame 210 and/or the ground). In some embodiments, the rotation frame 220 can rotate less than 90°, for example, in the range of 85°, 80°, 75°, or less. Rotation of the rotation frame 220 may be actuated by one or more motors, for example, pushing the vertical sliders 252 upward along the vertical tracks 216 to impart a rotational force about the rotation hinges 250 through the legs 254.

As shown in FIGS. 7A and 7B, the components within the rotation frame 220 and paddle assembly 240 are in substantially the same configuration as in the state shown in FIG. 6. After rotation of the rotation frame 220, the items 205 are generally resting on the back plates 245 (not visible in FIGS. 7A and 7B) of the paddle assembly 240. If the end pushers 226 did not move partially outward at the stage depicted in FIG. 6, the end pushers 226 can move outward to reduce the pressure exerted against the items 205. It may be desirable for the end pushers 226 to remain partially inserted such that at least a portion of the end pushers still extends through the holes 282 to prevent the source tray 280 from falling out of position.

Figure 8:
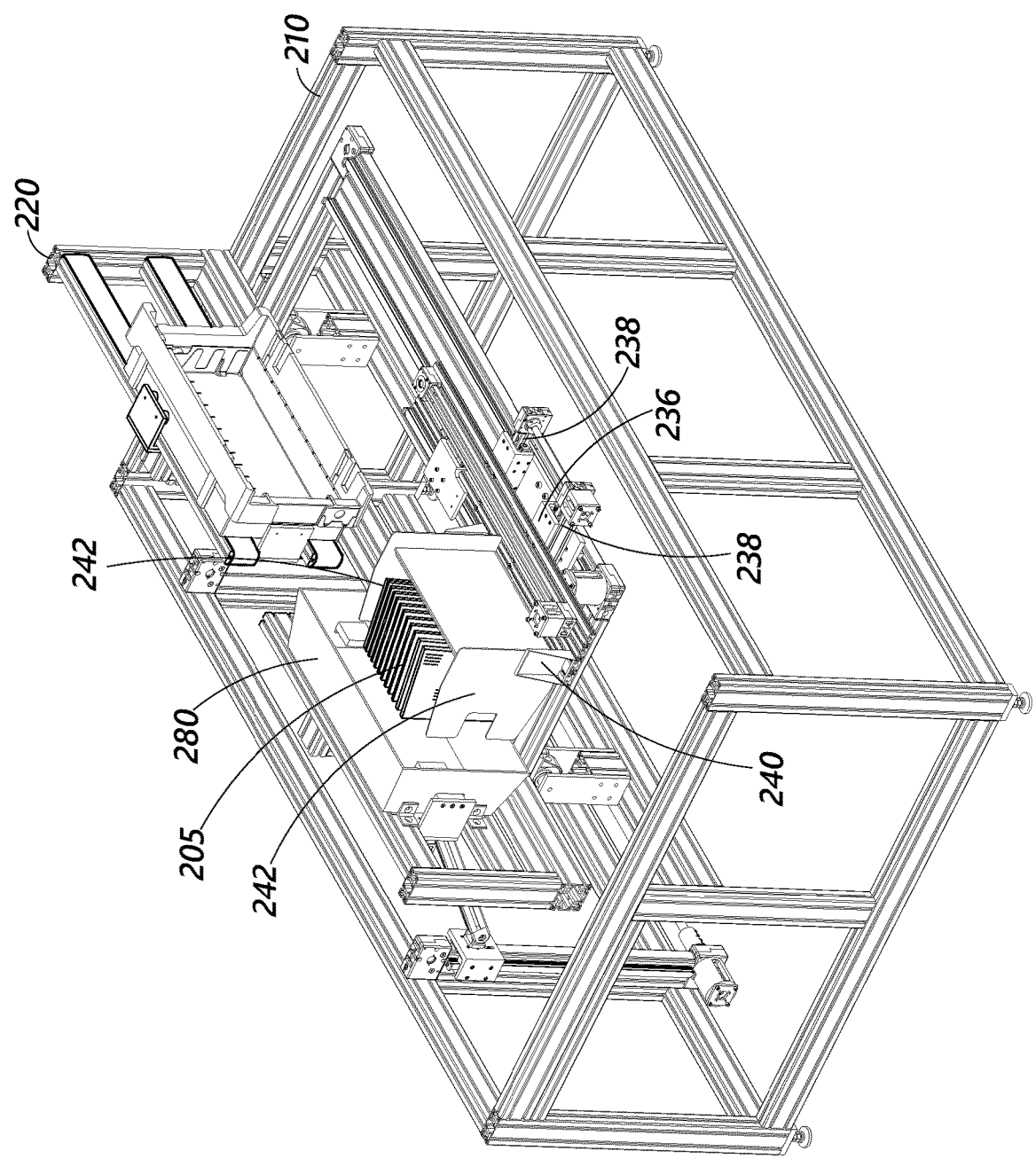
FIG. 8 is a perspective view of a sixth state of the tray content transfer system of FIG. 3 during the exemplary tray content transfer process of FIGS. 3-7.

After rotation of the rotation frame 220, the process continues to the configuration shown in FIG. 8. As shown in FIG. 8, the vertical translation platform 236 has slid back along the axis 237, along the vertical track members 238 such that the paddle assembly 240 and items 205 held therein withdraw from the source tray 280. Generally, the paddle assembly 240 travels a distance sufficient to allow all items 205 and the paddles 242 to be outside of the inner space defined by the source tray 280. In some aspects, the step of withdrawing the items 205 from the source tray 280 may be facilitated when the angle of rotation in FIGS. 7A and 7B is greater than 90°, as the back plates 245 (not visible in FIG. 8) are sloped downward away from the source tray 280 such that a letter 205 that may fall out of the stack will tend to fall into the paddle assembly 240, rather than into the space between the paddle assembly 240 and the source tray 280 where the letter 205 could be lost.

Figure 9:
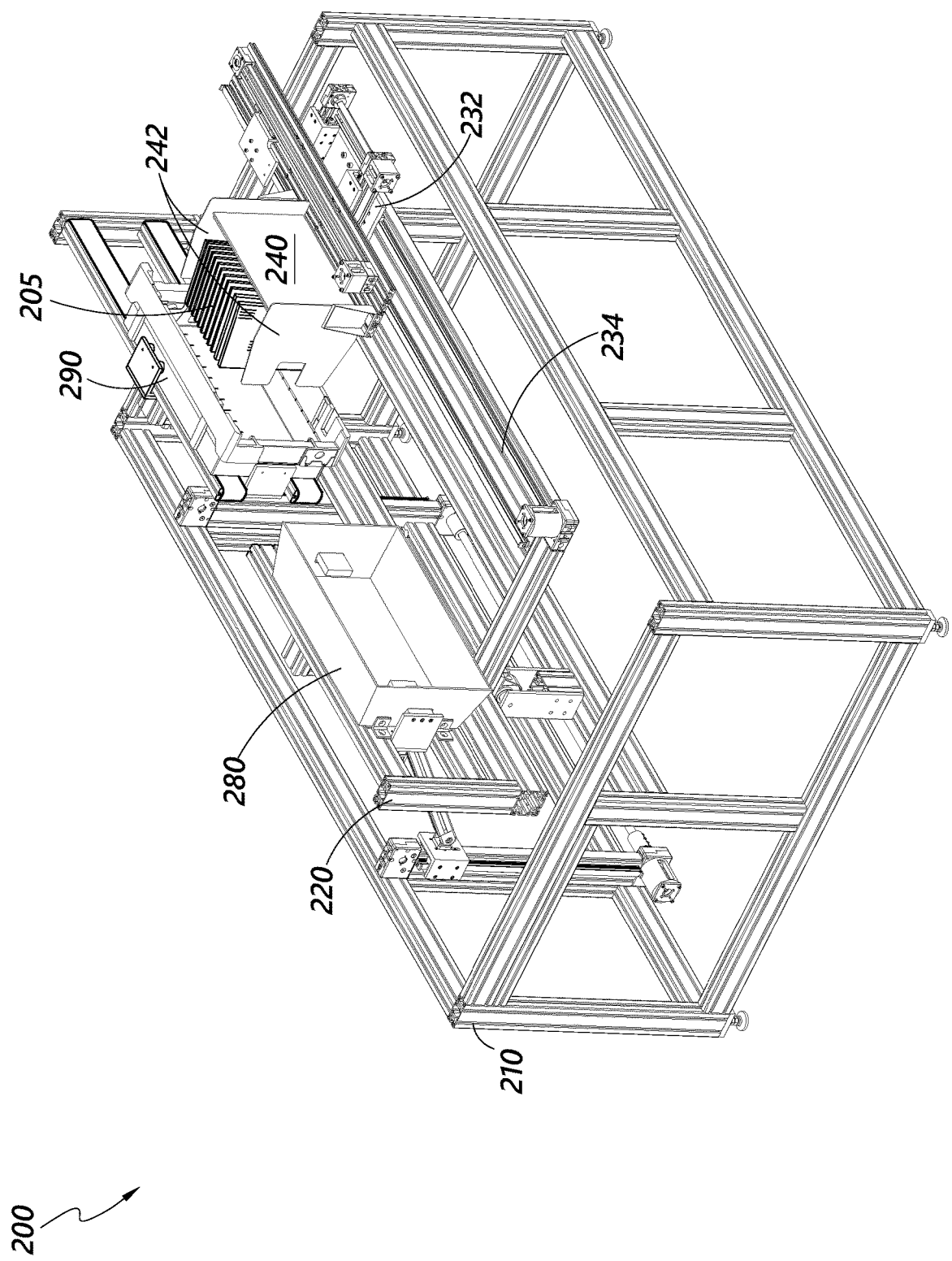
FIG. 9 is a perspective view of a seventh state of the tray content transfer system of FIG. 3 during the exemplary tray content transfer process of FIGS. 3-8.

After sliding of the vertical translation platform 236, the process continues to the configuration shown in FIG. 9. As shown in FIG. 9, after the items 205 are withdrawn from the source tray 280, the horizontal translation platform 232 has traveled along the axis 233, along the horizontal track member 234 to move the paddle assembly 240 containing items 205 to a position adjacent to the process tray 290. During the horizontal translation, the items 205 are held in place relative to the paddle assembly 240 by the paddles 242 and the back plates 245 (not visible in FIG. 9). After the paddle assembly 240 is moved horizontally to a position adjacent to the process tray 290, the process continues to the state depicted in FIG. 10.

Figure 10:
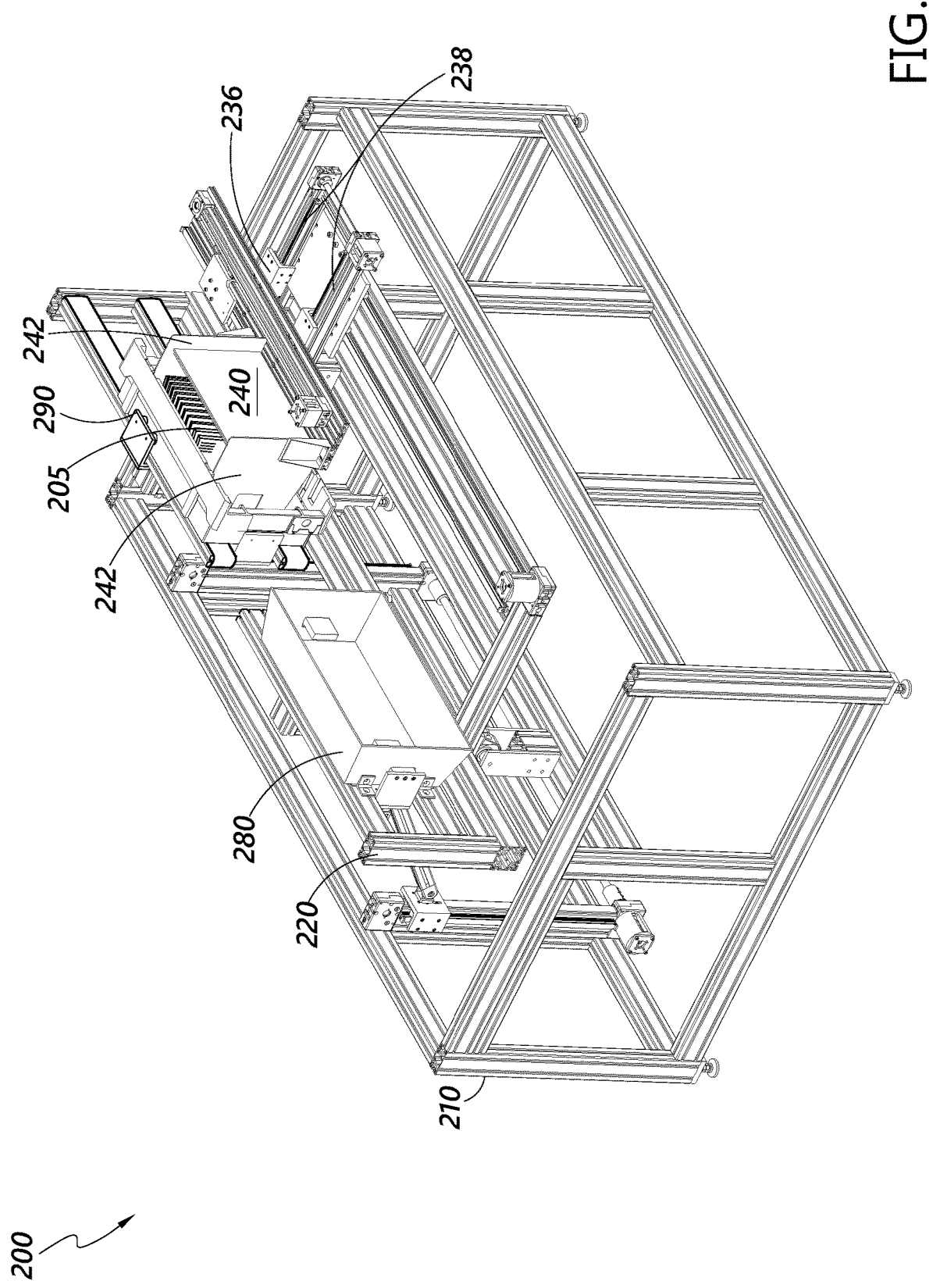
FIG. 10 is a perspective view of an eighth state of the tray content transfer system of FIG. 3 during the exemplary tray content transfer process of FIGS. 3-9.

As shown in FIG. 10, the vertical translation platform 236 has moved along the axis 237, along the vertical track members 238 to position the paddle assembly 240 and items 205 at least partially within the process tray 290. The direction and distance traveled by the vertical translation platform 236 may be similar or identical to the direction and distance traveled by the vertical translation platform 236 between FIG. 4 and FIG. 5. After the items 205 and paddle assembly 240 have been moved into the process tray 290 as shown in FIG. 10, the process continues to the state depicted in FIGS. 11A and 11B.

Figure 11A:
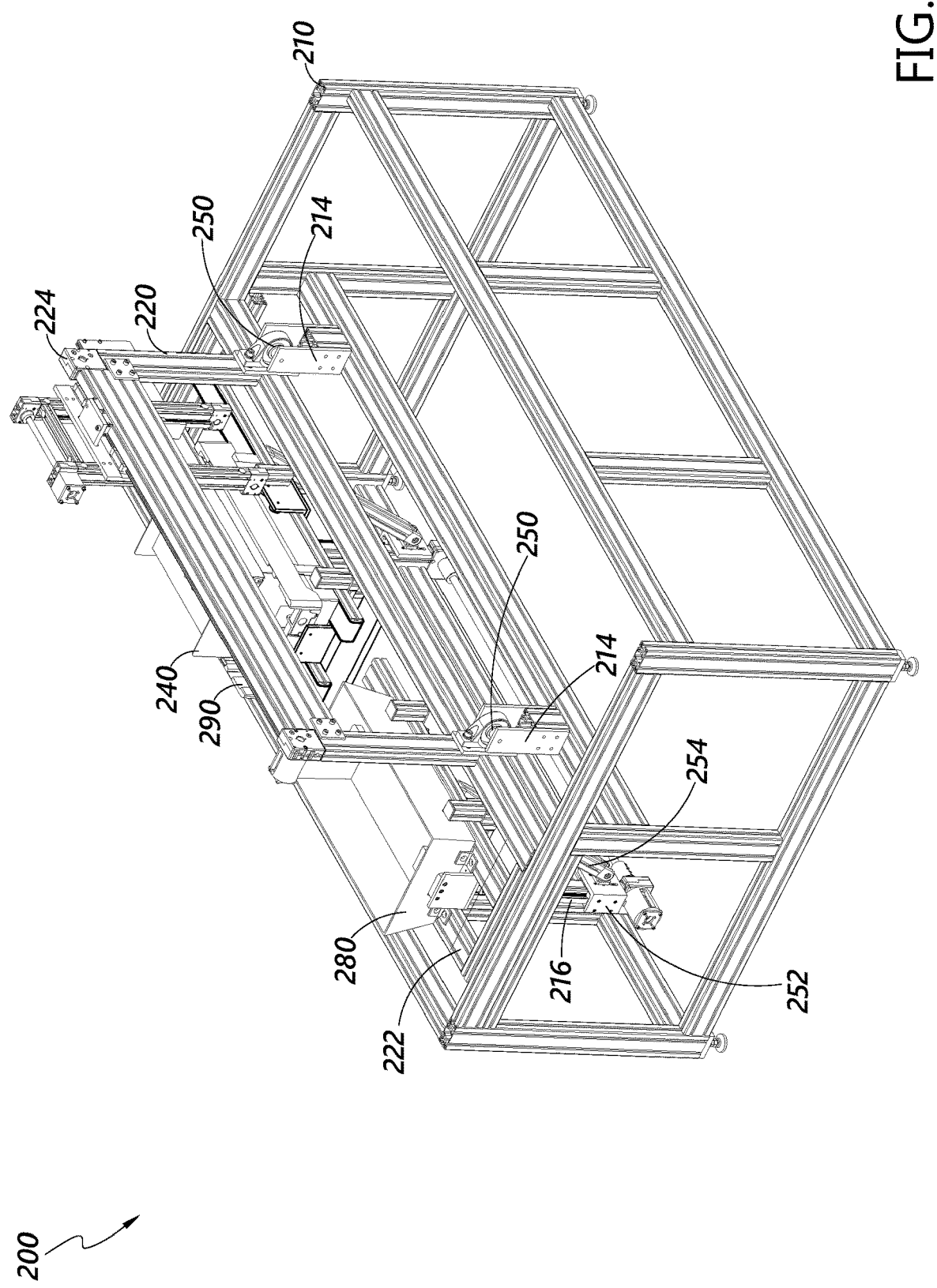
FIG. 11A is a rear perspective view of a ninth state of the tray content transfer system of FIG. 3 during the exemplary tray content transfer process of FIGS. 3-10.
Figure 11B:
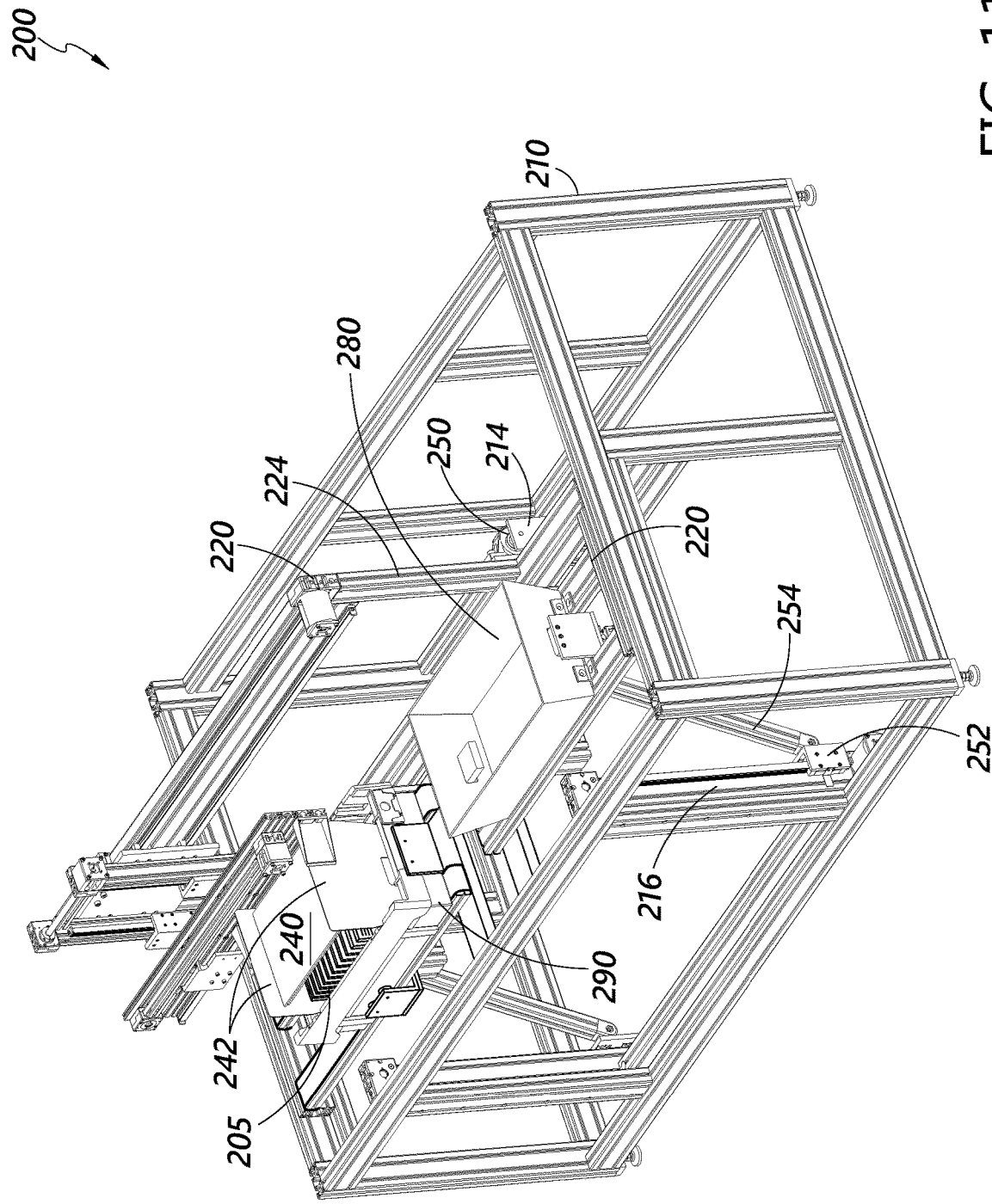
FIG. 11B is a front perspective view of the ninth state of the tray content transfer system of FIG. 3 during the exemplary tray content transfer process of FIGS. 3-11A.

As shown in FIGS. 11A and 11B, the entire rotation frame 220 has rotated forward about the hinges 250 along the axis between the pivot points 214. In some embodiments, the rotation frame 220 travels the same angular distance traveled between FIG. 6 and FIGS. 7A and 7B (e.g., 90°, 95°, 100°, 105° or more) such that the rotation frame 220 is returned to its initial rotational state. Thus, the horizontal sub-frame 222 is again in a generally horizontal orientation, and the vertical sub-frame 224 is again in a generally vertical orientation. Rotation of the rotation frame 220 back to its initial rotational state may be actuated by one or more motors, for example, pushing the vertical sliders 252 downward along the vertical tracks 216 to impart a rotational force about the rotation hinges 250 through the legs 254.

As shown in FIGS. 11A and 11B, the components within the rotation frame 220 and paddle assembly 240 are in substantially the same configuration as the state shown in FIG. 10. After rotation of the rotation frame 220, the items 205 are generally resting on the bottom interior surface of the process tray 290. After rotation of the rotation frame 220 as shown in FIGS. 11A and 11B, the process continues to the configuration shown in FIG. 12.

Figure 12:
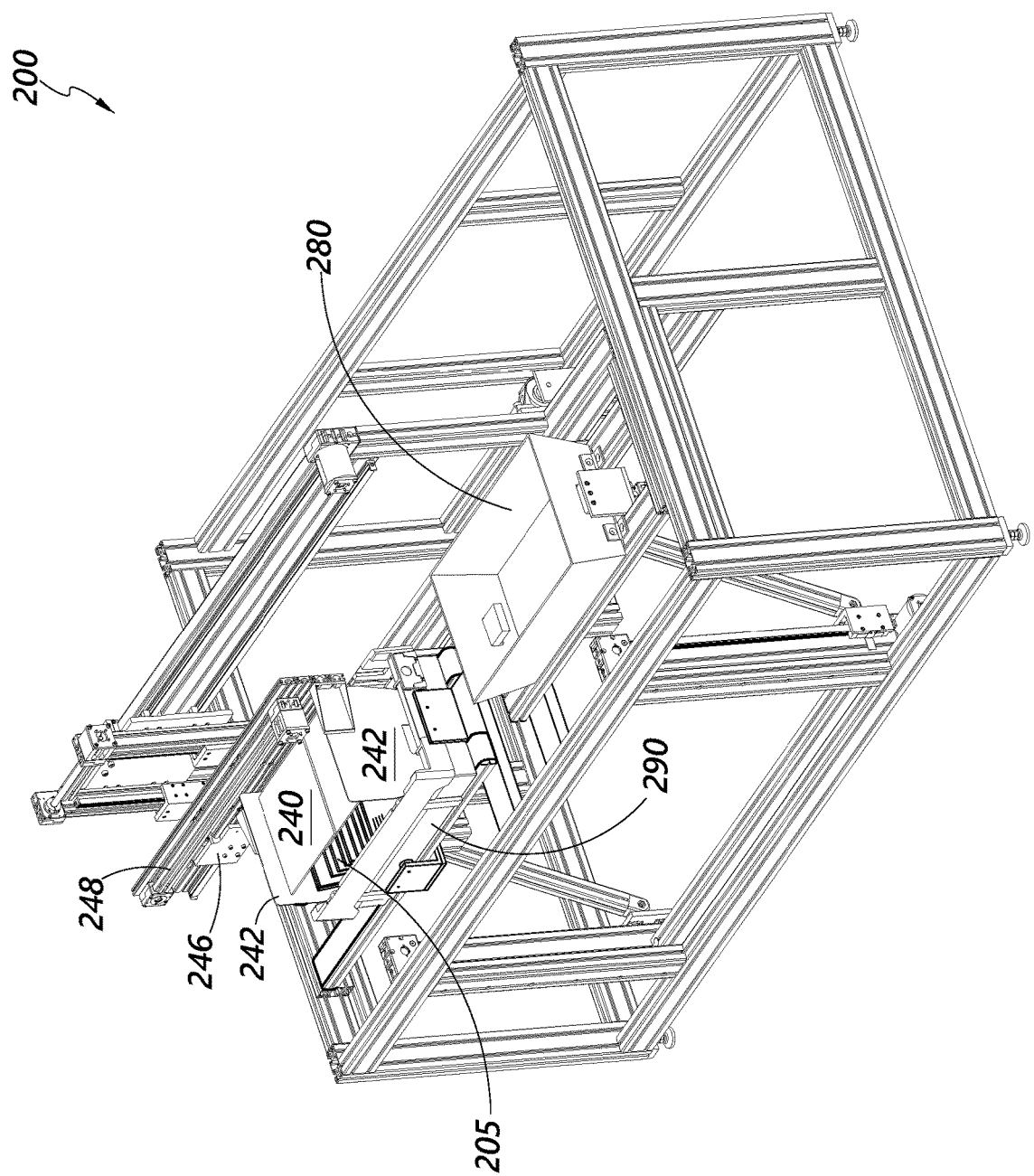
FIG. 12 is a perspective view of a tenth state of the tray content transfer system of FIG. 3 during the exemplary tray content transfer process of FIGS. 3-11B.

Referring now to FIG. 12, the paddle slider 246 has moved outward along the axis 247, along the paddle assembly track member 248 such that at least one of the paddles 242 moves outward (e.g., away from the other paddle 242) to release the stack of items 205, allowing the items 205 to rest on the bottom interior surface of the process tray 290 without being held in a vertical orientation by the paddles 242. After the paddles 242 move outward, the process continues to the configuration shown in FIG. 13.

Figure 13:
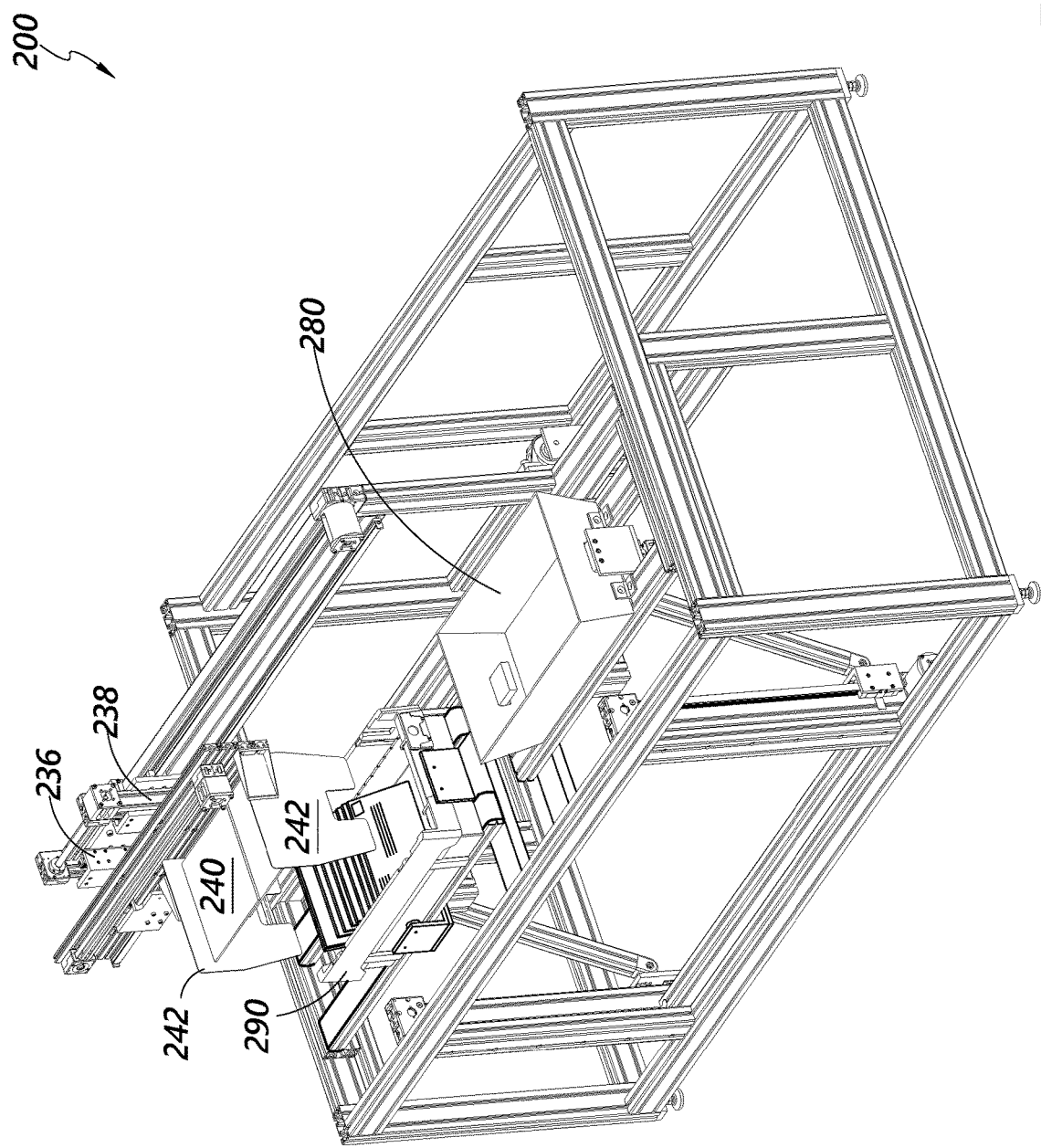
FIG. 13 is a perspective view of an eleventh state of the tray content transfer system of FIG. 3 during the exemplary tray content transfer process of FIGS. 3-12.

Referring now to FIG. 13, the vertical translation platform 236 slides upward along axis 237, along the vertical track members 238 such that the paddle assembly 240 moves upward to a position clear of the items 205 and the process tray 209. In some embodiments, the vertical translation platform 236 can move fully upward to its initial vertical position as shown in FIG. 3. Once the paddles 242 are removed from the process tray 290 and the items 205 fall into a slanted stack within the process tray 290, the items 205 and process tray 290 are in a suitable configuration for further processing.

Figure 14:
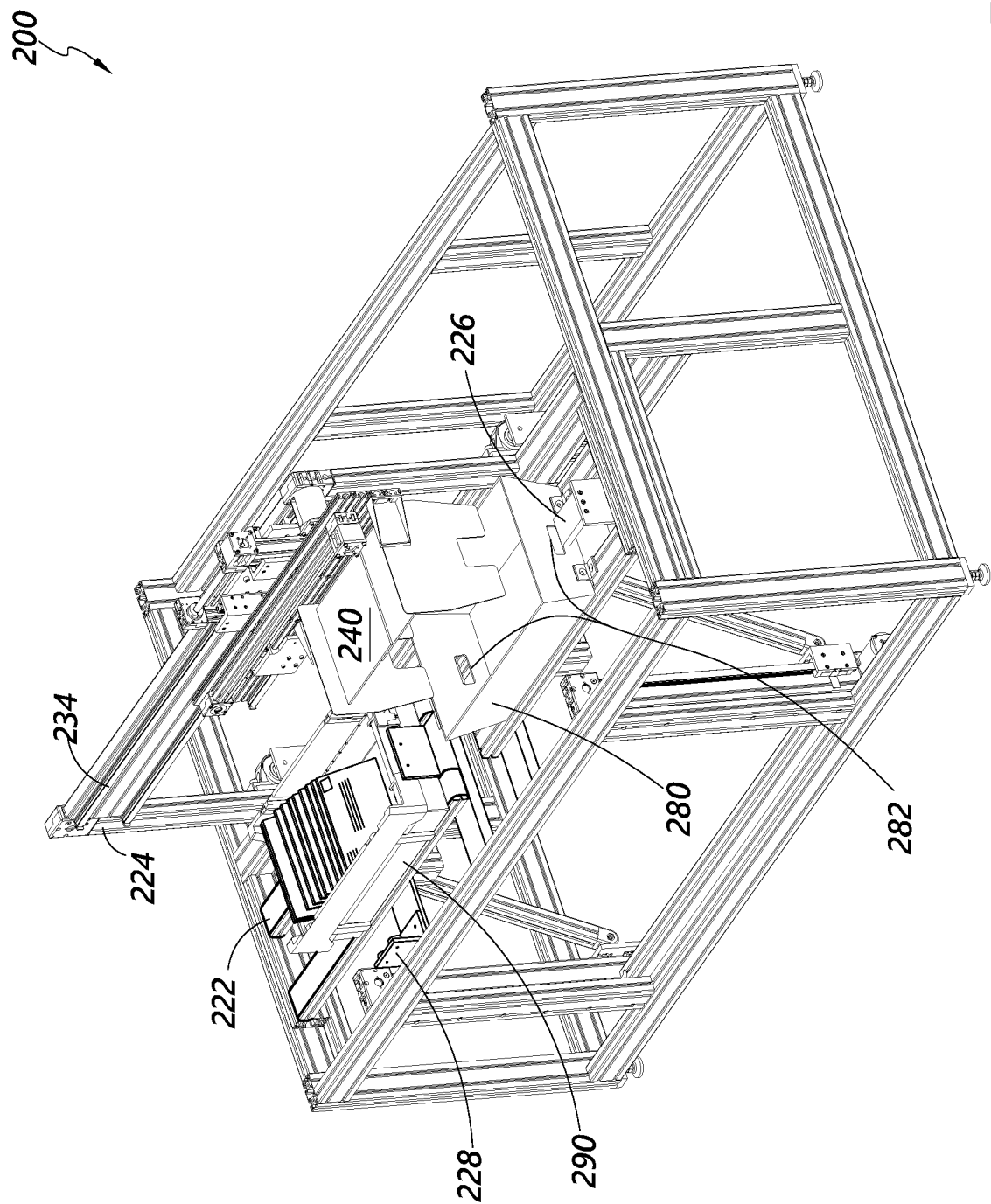
FIG. 14 is a perspective view of a twelfth state of the tray content transfer system of FIG. 3 during the exemplary tray content transfer process of FIGS. 3-13.

Continuing to FIG. 14, the tray content transfer system returns to its initial state such that the source tray 280 and process tray 290 can be removed. The horizontal translation platform 232 travels along the horizontal track member 234 to move the paddle assembly 240 back to its initial position above the source tray 280 as shown in FIG. 3. The end pushers 226 and process tray clamps 228 move outward to release the source tray 280 and process tray 290. Accordingly, the now-empty source tray 280 and the process tray 290 containing the items 205 can be removed from the tray content transfer system 200, and the tray content transfer process can be repeated indefinitely as additional source trays 280 arrive with contents to be transferred.

Figure 15:
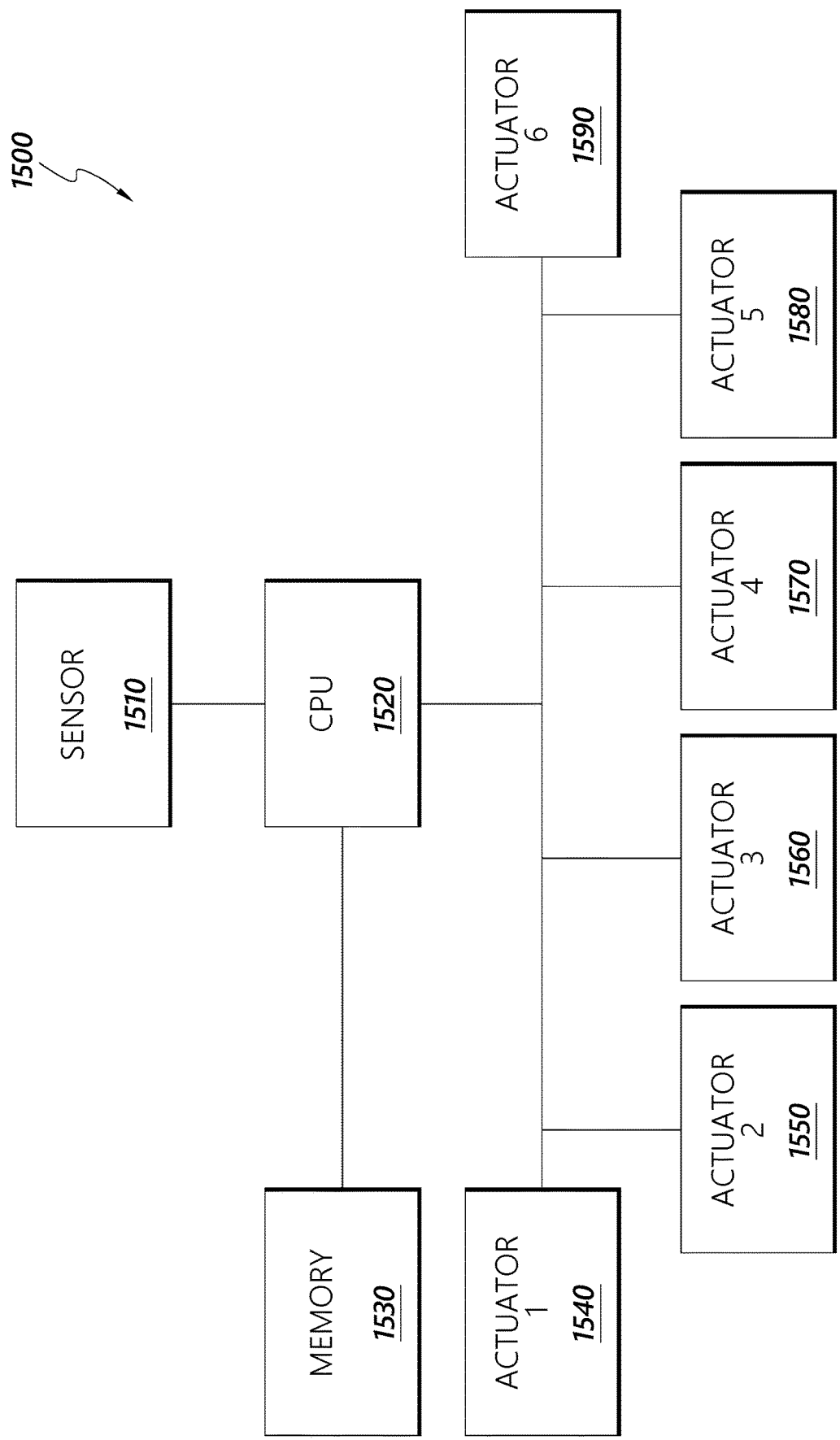
FIG. 15 is a block diagram of a tray content transfer system.

FIG. 15 is a block diagram of a tray content transfer system 1500 in accordance with an exemplary embodiment. The system 1500 includes a sensor 1510 in communication with a CPU 1520. The CPU 1520 is further in communication with a memory 1530 and actuators including actuator 1 1540, actuator 2 1550, actuator 3 1560, actuator 4 1570, actuator 5 1580, and actuator 6 1590. Although the system 1500 is depicted as having 6 actuators, the number of actuators in various embodiments can be greater or smaller than 6, for example, based on the number of parts to be moved in any particular embodiment of the system 1500.

The sensor 1510 is configured to detect the presence of one or more containers or other objects within the system 1500. For example, the sensor 1510 can be configured to detect the presence of a source tray and/or a process tray before initiating a transfer process. In various implementations, the sensor 1510 can include one or more proximity sensors, profile sensors, pressure sensors, force sensors, scales, cameras, optical pattern recognition devices such as barcode scanners, light gates, or the like. In some embodiments, the sensor 1510 can include a manually activated device, such as a button, configured to produce a signal indicating that a source tray and a process tray have been loaded into the system 1500. In some embodiments, the sensor 1510 can include a first sensor configured to detect the presence of a source tray and a second sensor configured to detect the presence of a process tray.

The CPU 1520 is configured to control and receive input from the sensor 1510, the memory 1530, and the actuators 1540, 1550, 1560, 1570, 1580, 1590. The memory 1530 can store data received from the CPU 1520 and send data stored therein to the CPU 1520. Examples of information that may be received and stored in the memory 1530 include, for example, information received at the CPU 1520 from the sensor 1510, information received at the CPU from the actuators 1540, 1550, 1560, 1570, 1580, 1590, and one or more computer-executable instructions that, when executed by the CPU 1520, cause the CPU to selectively activate and/or deactivate the actuators 1540, 1550, 1560, 1570, 1580, 1590 in a predetermined sequence to transfer items from a source tray to a process tray.

The actuators 1540, 1550, 1560, 1570, 1580, 1590 can be electronically controllable actuators each coupled to and configured to move one or more mechanical components of the system 1500. Each actuator 1540, 1550, 1560, 1570, 1580, 1590 can include one or more electric motors, hydraulic cylinders, pneumatic actuators, screw jacks, servos, solenoids, or the like. In the exemplary tray content transfer system 200 depicted in FIGS. 2A-2D, the actuators may be arranged such that actuator 1 1540 is configured to move the end pushers 226 inward and outward to secure and release a source tray 280, actuator 2 1550 is configured to move the process tray clamps 228 inward and outward to secure and release a process tray 290, actuator 3 1560 is configured to move the vertical sliders 252 up and down the vertical tracks 216 to rotate the rotation frame 220 between upright and rotated orientations, actuator 4 1570 is configured to slide the horizontal translation platform 232 along axis 233 on the horizontal track member 234, actuator 5 1580 is configured to slide the vertical translation platform 236 along axis 237 on the vertical track members 238, and actuator 6 1590 is configured to slide the paddle slider 246 along axis 247 on the paddle assembly track member 248.

Figure 16:
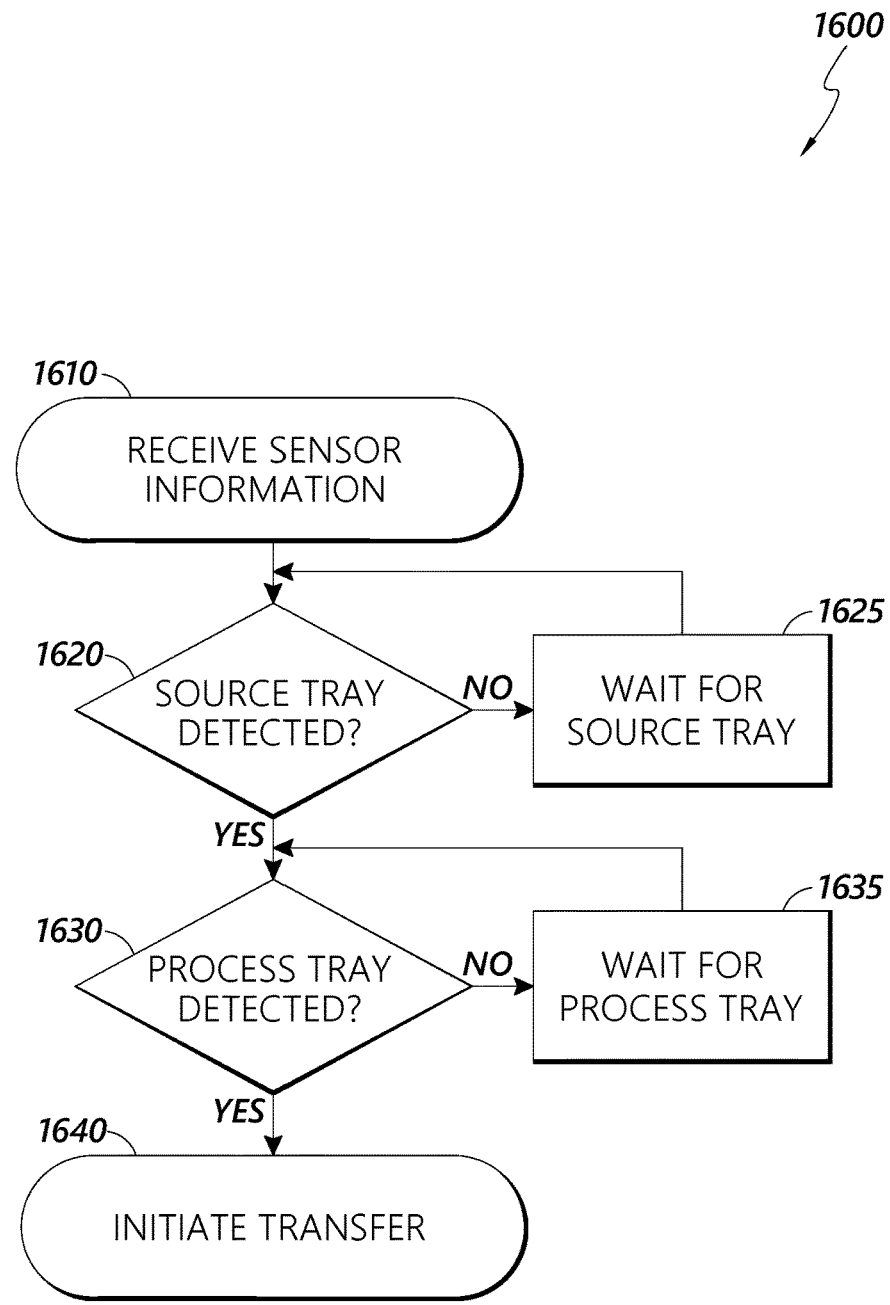
FIG. 16 is a flowchart illustrating an exemplary method of initiating the transfer of items from a container.

FIG. 16 is a flowchart illustrating an exemplary method 1600 of initiating the transfer of items from a container. The method 1600 can be performed by a computer system integrated within a system such as the tray content transfer system 1500 depicted in FIGS. 2A-15.

The method 1600 begins with block 1610, where the system 1500 begins receiving information from the sensor 1510. The information can be an electrical signal indicating that a source tray and/or a process tray have or have not been detected within the system 1500. When the system 1500 has begun receiving information from the sensor 1510, the method 1600 continues to decision state 1620.

At decision state 1620, the method 1600 determines whether a source tray has been detected. For example, the CPU 1520 can analyze a signal received from the sensor 1510 configured to detect the presence of a source tray within the system 1500 at a suitable location for transferring items from the source tray. If the method 1600 determines that a source tray has not been detected, the method 1600 continues to block 1625, where the method 1600 waits for a source tray to be detected and returns to decision state 1620. If the method 1600 determines that a source tray has been detected, the method continues to decision state 1630.

At decision state 1630, the method 1600 determines whether a process tray has been detected. For example, the CPU 1520 can analyze a signal received from the sensor 1510 configured to detect the presence of a process tray within the system 1500 at a suitable location for receiving items transferred from the source tray. If the method 1600 determines that a process tray has not been detected, the method 1600 continues to block 1635, where the method 1600 waits for a process tray to be detected and returns to decision state 1630. If the method 1600 determines that a process tray has been detected, the method 1600 continues to block 1640. At block 1640, the method 1600 terminates by initiating the transfer of items from the source tray to the process tray.

Figure 17:
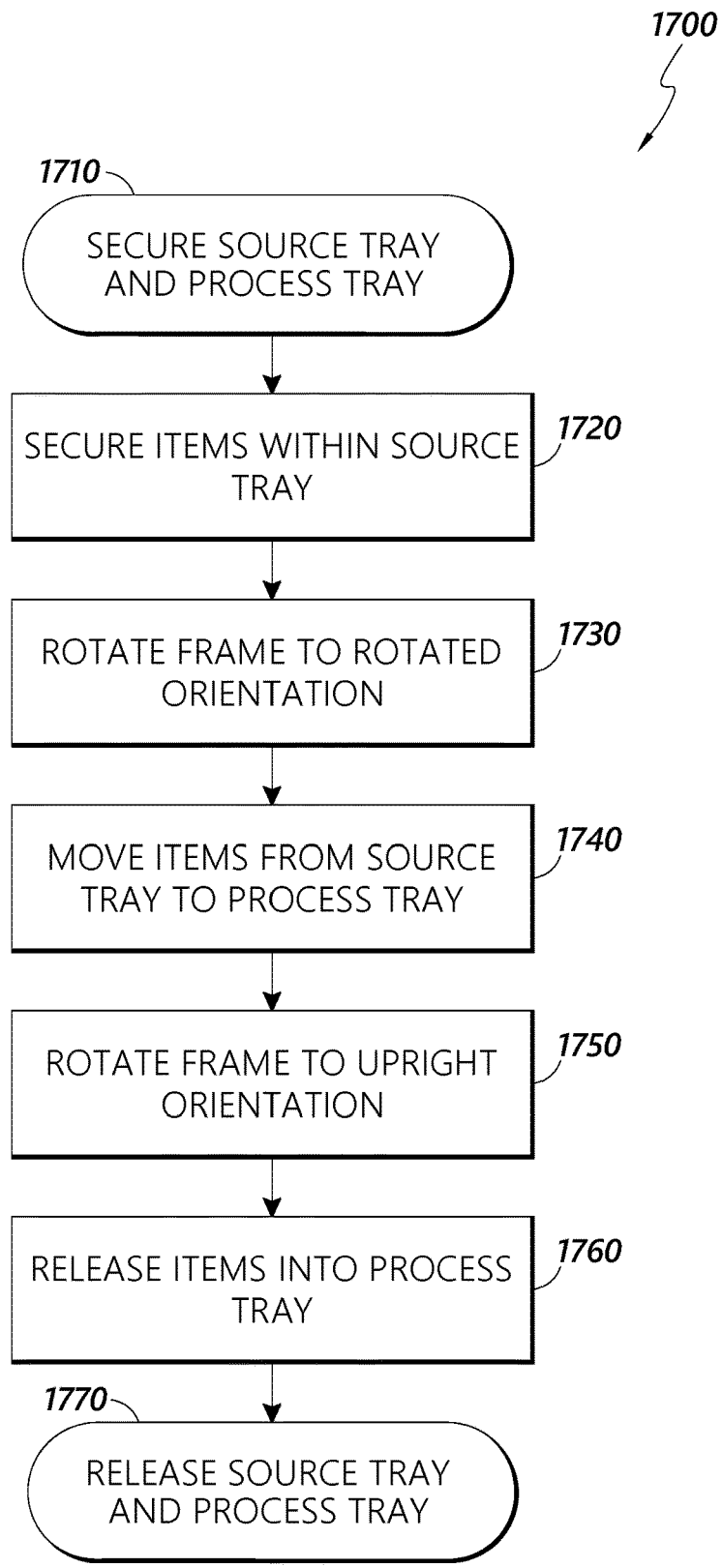
FIG. 17 is a flowchart illustrating an exemplary method of transferring items from a source tray to a process tray in a tray content transfer system.

FIG. 17 is a flowchart illustrating an exemplary method 1700 of transferring items from a source tray to a process tray in a tray content transfer system. The method 1700 can be initiated at block 1640 of the method 1600 depicted in FIG. 1600. The method 1700 can be performed by a computer integrated within a tray content transfer system such as the systems 200 and 1500 depicted in FIGS. 2A-15.

The method 1700 begins at block 1710, where the source tray 280 and process tray 290 are secured within the tray content transfer system 200, 1500. Securing the source tray 280 and the process tray 290 can include moving the end pushers 226 and the process tray clamps 228 inward to secure the source tray 280 and the process tray 290 to the horizontal sub-frame 222. The end pushers 226 and process tray clamps 228 can be moved inward by actuators such as actuator 1 1540 and actuator 2 1550 based on instructions provided by the CPU 1520. After the source tray 280 and the process tray 290 are secured within the system 200, 1500, the method 1700 continues to block 1720.

At block 1720, the items 205 within the source tray 280 are secured. For example, the items 205 can be secured by moving one or both of the paddles 242 inward, such as by moving the paddle slider 246 along axis 247 on the paddle assembly track member 247 to move the paddles 242 closer together and engage the items 250 between the paddles 242. The paddles 242 can be moved by actuators such as actuator 6 1590 based on instructions provided by the CPU 1520. After the items 205 within the source tray 280 are secured, the method 1700 continues to block 1730.

At block 1730, the rotation frame 220 is rotated to a rotated orientation. For example, the rotation frame 220 can be rotated by moving vertical sliders 252 up the vertical tracks 216 such that the rotation frame 220 rotates about the hinges 250 by an angle of approximately 90° or more, and the items 205 are at least partially supported by the back plates 245 of the paddle assembly 240. The rotation frame 220 can be rotated by actuators such as actuator 3 1560 based on instructions provided by the CPU 1520. After the rotation frame 220 is rotated to a rotated orientation, the method 1700 continues to block 1740.

At block 1740, the items 205 are moved from the source tray 280 to the process tray 290. For example, the items 205 can be moved from the source tray 280 to the process tray 290 by first, sliding the vertical translation platform 236 away from the source tray 280 along axis 237 on the vertical track members 238, second, sliding the horizontal translation platform 232 along axis 233 on the horizontal track member 234 such that the paddle assembly 240 containing items 205 is positioned near or adjacent to the process tray 290, and third, sliding the vertical translation platform 236 toward the process tray 280 along axis 237 on the vertical track members 238 such that the paddle assembly 240 and items 205 are at least partially within the process tray 290. The horizontal translation platform 232 and the vertical translation platform 236 can be moved by actuators such as actuator 4 1570 and actuator 5 1580, based on instructions provided by the CPU 1520. After the items 205 are moved from the source tray 280 to the process tray 290, the method 1700 continues to block 1750.

At block 1750, the rotation frame 220 is rotated to an upright orientation. For example, the rotation frame 220 can be rotated by moving vertical sliders 252 back down the vertical tracks 216 such that the rotation frame 220 rotates about the hinges 250 by the same angle of rotation as in block 1730. After the rotation frame 220 is rotated back to an upright orientation, some or all of the items 205 may remain suspended above the process tray 290 by the paddles 242, and/or some or all of the items 205 may begin to fall into the process tray, depending on the clasping force exerted against the items 205 by the paddles 242. The rotation frame 220 can be rotated by actuators such as actuator 3 1560 based on instructions provided by the CPU 1520. After the rotation frame 220 is rotated to an upright orientation, the method 1700 continues to block 1760.

At block 1760, the items 205 are released into the process tray 290. For example, the items 205 can be released by moving one or both of the paddles 242 outward, such as by moving the paddle slider 246 along axis 247 on the paddle assembly track member 247 to move the paddles 242 further apart and cease to clasp the items 250 between the paddles 242. The paddles 242 can be moved by actuators such as actuator 6 1590 based on instructions provided by the CPU 1520. After the items 205 are released into the process tray, the method 1700 continues to block 1770.

The method 1700 terminates at block 1770, where the source tray 280 and process tray 290 are released within the tray content transfer system 200, 1500. Releasing the source tray 280 and the process tray 290 can include moving the end pushers 226 and the process tray clamps 228 outward to release the source tray 280 and the process tray 290 from the horizontal sub-frame 222. The end pushers 226 and process tray clamps 228 can be moved outward by actuators such as actuator 1 1540 and actuator 2 1550 based on instructions provided by the CPU 1520. After the source tray 280 and the process tray 290 are released from the system 200, 1500, the method 1700 terminates. The source tray 280 and the process tray 290 can be removed from the system manually or by one or more automated systems.

Figure 18:
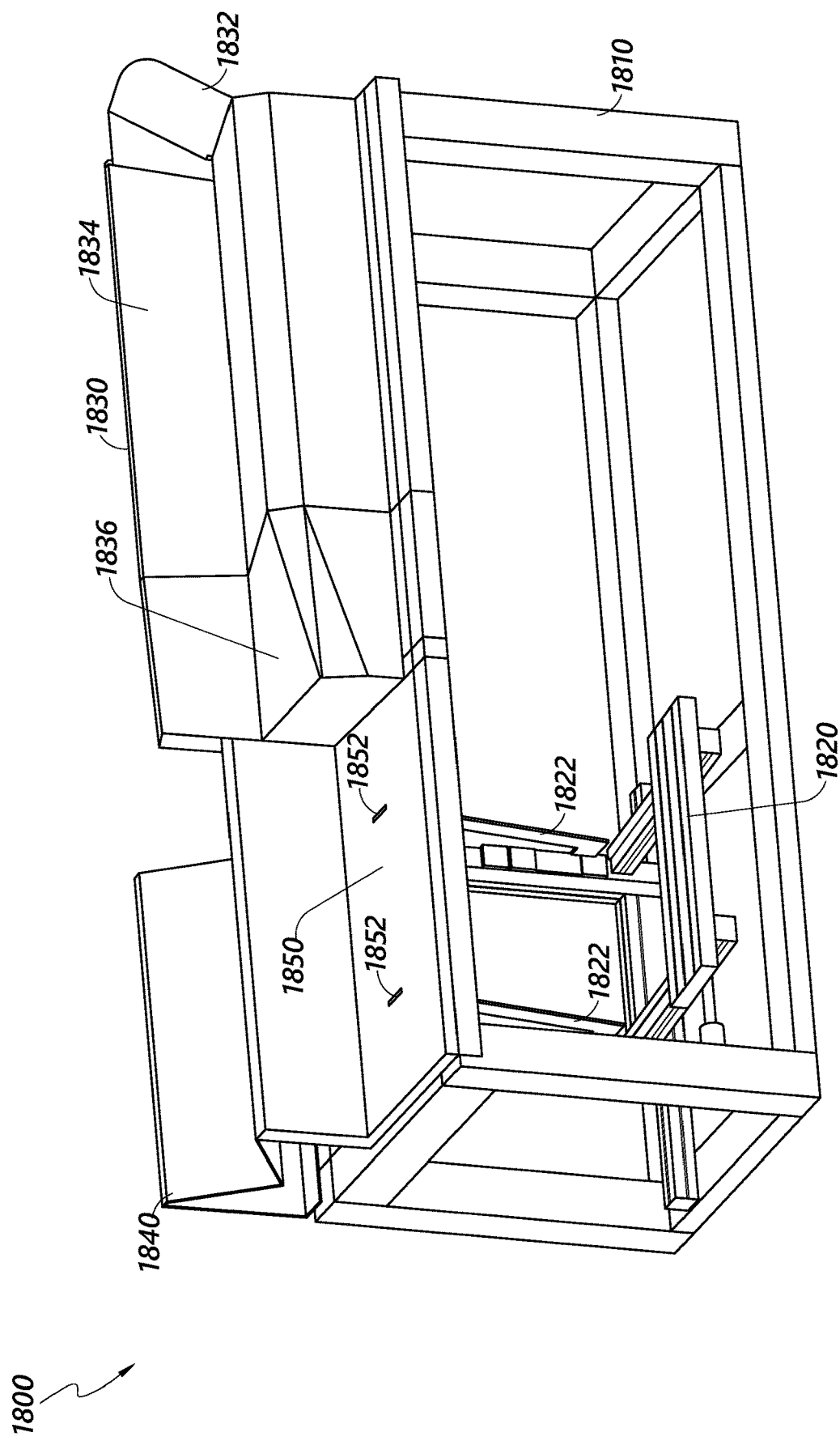
FIG. 18 is a front perspective view of an exemplary tray content transfer system.

FIG. 18 is a front perspective view of a tray content transfer system 1800 in accordance with an exemplary embodiment. The tray content transfer system 1800 generally includes a frame 1810, an item platform 1830, a source tray platform 1840, a process tray platform 1850, and a pedal 1820 mechanically coupled to two pushers 1822.

The frame 1810 is generally configured to provide a stable support for the item platform 1830, the source tray platform 1840, the process tray platform 1850, and the pedal 1820. The frame 1810 includes various structural members 1812 and two vertical tracks 1816. As will be described with reference to the pedal 1820, the vertical tracks 1816 are configured to accommodate and/or at least partially actuate vertical movement of the pushers 1822. In various embodiments, the frame 1810 can be any size, shape, or configuration suitable to support the item platform 1830, the source tray platform 1840, the process tray platform 1850, and the pedal 1820. For example, the frame 1810 can be built into a wall, a shelf, a floor, or the like, and need not be a free-standing rectangular frame as shown in the figures.

The process tray platform 1850 is a generally rigid horizontal surface including two slots 1852. In various embodiments, at least a portion of the process tray platform 1850 can be a solid, flat surface, and/or can include a textured surface, a grating, a mesh, a plurality of longitudinal members, or the like. The slots 1852 are sized, shaped, and located within the process tray platform so as to allow at least a portion of each of the pushers 1822 to extend through the slots 1852. For example, the slots 1852 can have dimensions at least as large as cross-sectional dimensions of the pushers 1822 such that the pushers 1822 can pass through the slots 1852 without obstruction, friction, undue wear and tear, etc. As shown in FIGS. 19-22, the process tray platform 1850 has a length and width selected to accommodate a process tray 1890 resting thereon.

The source tray platform 1840 is a shelf located in proximity to the process tray platform 1850. In various embodiments, the source tray platform 1840 can be located at any side proximate the process tray platform 1850. The source tray platform can include a generally rigid material and/or can be at least partially formed from a textured surface, a grating, a mesh, or the like. As shown in FIGS. 19-22, the source tray platform 1840 is sized and shaped to receive a source tray 1880.

The item platform 1830 is a shelf located at a second location proximate the process tray platform 1850. The item platform 1830 includes a bottom surface 1832, a rear surface 1834, and a transition segment 1836. The item platform 1830 can include a generally rigid material, and/or can be at least partially formed from a textured surface, a grating, a mesh, or the like. In some embodiments, the bottom surface 1832 is slanted backward toward the rear surface 1834, such that items on the item platform 1830 rest against the bottom surface 1832 and the rear surface 1834, and are thereby prevented from falling off of the item platform 1830. The transition segment 1836 is a generally flat surface, such as a ramp or slope, contiguous with the bottom surface 1832. The transition segment 1836 is sloped in two dimensions. The transition segment 1836 is generally sloped downward from the item platform 1830 toward the process tray platform 1850, and further has a transverse frontward slope component to transition from the backward slant of the bottom surface 1832 to a level profile at the end of the transition segment 1836 adjacent to the process tray platform 1850. As shown in FIGS. 19-22, the item platform 1830 is configured to receive items 1805 that are not in a source tray 1880, and to accommodate sliding of the items along the bottom surface 1832 and transition segment 1836 into a process tray 1890.

The pedal 1820 is a foot operable pedal disposed in a lower portion of the tray content transfer system 1800. The pedal 1820 can be disposed at least partially within the boundaries of the frame 1810, in a location where it can be accessed and actuated by an operator. The pedal 1820 is mechanically coupled to the pushers 1822, such that depressing the pedal 1820 causes the pushers 1822 to travel upward along the vertical tracks 1816 and extend at least partially through the slots 1852. Similarly, releasing the pedal upward from a depressed position causes the pushers 1822 to travel downward along the vertical tracks 1816 so that the ends of the pushers 1822 do not extend beyond the surface of the process tray platform 1850. The operation of the pedal 1822 will be described below with reference to FIGS. 19-22.

FIGS. 19-22 sequentially illustrate an example process for transferring the contents of a source tray 1880 to a process tray 290. Although the process of FIGS. 19-22 is shown and described in the context of the tray content transfer system 1800 depicted in FIG. 18, it will be appreciated that the same or similar steps may be implemented in any other tray content transfer system. The process of FIGS. 19-22 can be performed at least partially manually and/or automatically, for example, by a computer system integrated within a system such as the tray content transfer system 1800 depicted in FIG. 18.

Figure 19:
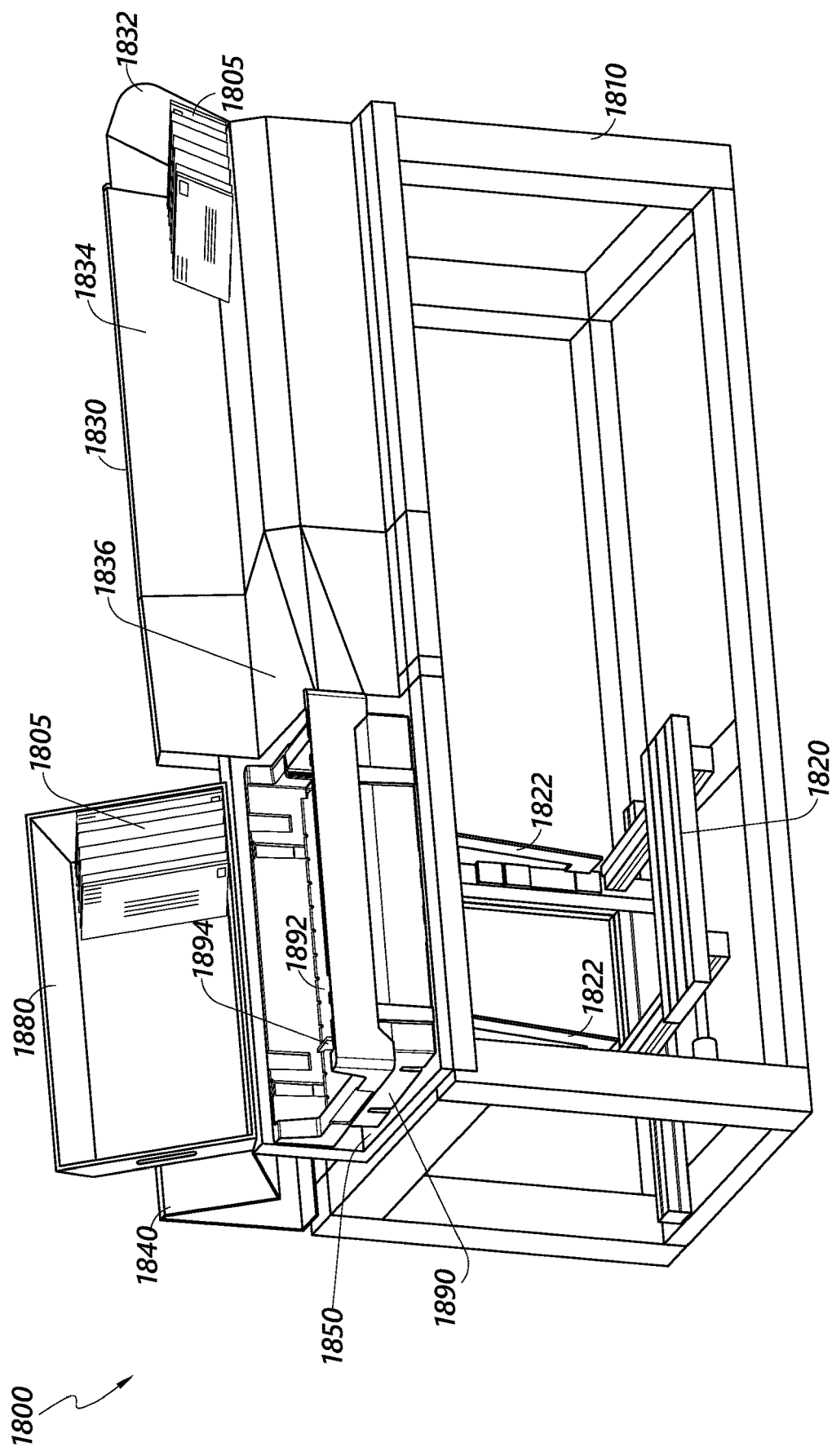
FIG. 19 is a perspective view of an initial state of a tray content transfer system during an exemplary tray content transfer process.

FIG. 19 depicts an initial state of the tray content transfer system 1800 for a transfer process. In the initial state, the items 1805 can be contained within the source tray 1880 and/or on the item platform 1830. The items can be, for example, letters, flats, etc. In the initial state of FIG. 19, the process tray 1890 has been placed onto the process tray platform 1850. The process tray 1890 includes a movable inner surface 1892 and may further include a divider 1894. The source tray 1880 has been placed onto the source tray platform 1840 so that it sits at an angle relative to the process tray 1890. Alternatively or in addition to placing the source tray 1880 onto the source tray platform 1840, items 1805 can be placed onto the item platform 1830. For example, loose items 1805 may not be received in a source tray 1880, and/or an operator of the tray content transfer system 1800 may prefer to transfer items from a source tray 1880 to the item platform 1830 rather than place the entire source tray 1880 onto the source tray platform 1840.

Figure 20:
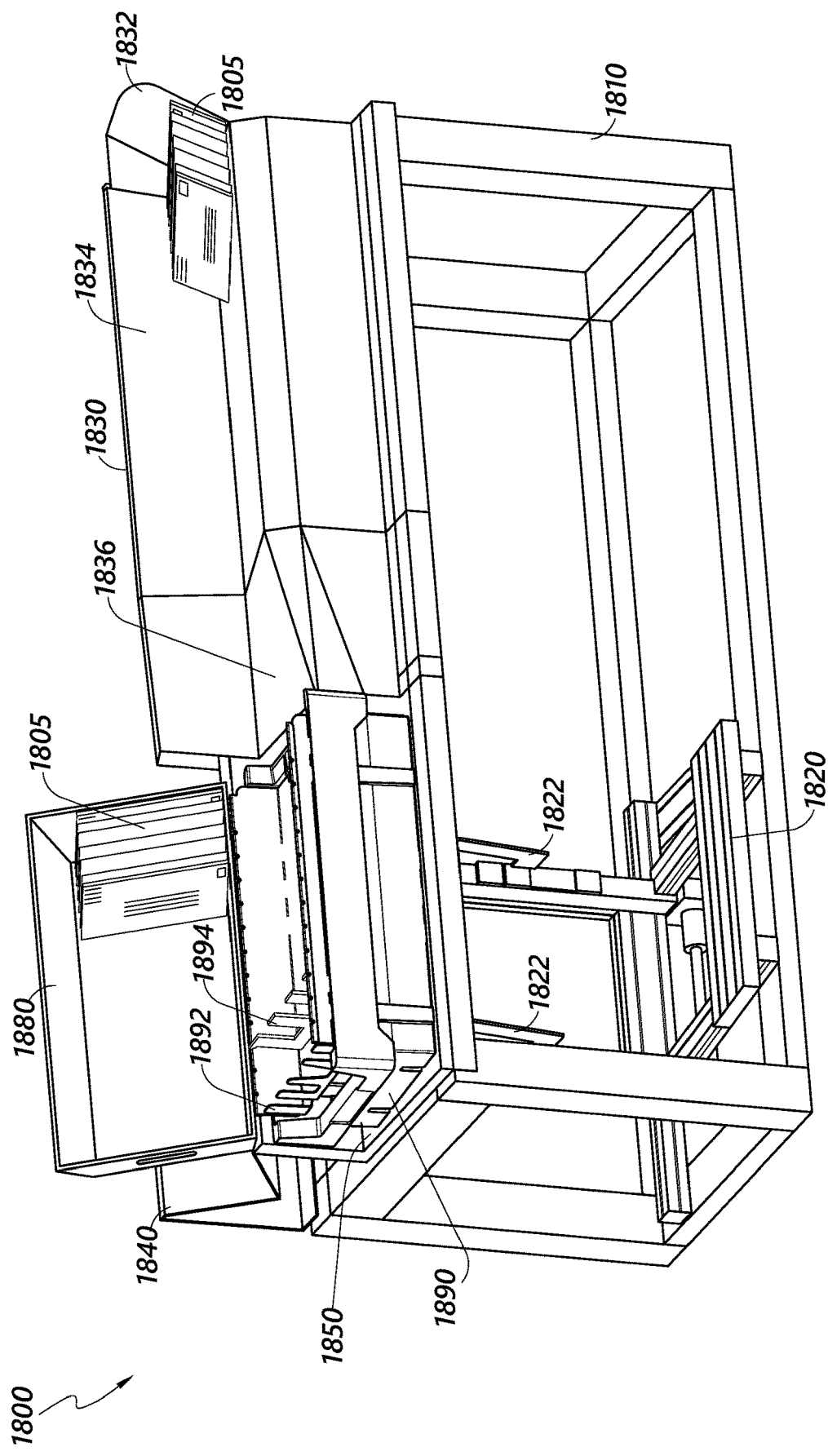
FIG. 20 is a perspective view of a second state of the tray content transfer system of FIG. 19 during the exemplary tray content transfer process of FIG. 19.

After the process tray 1890 has been placed onto the process tray platform 1850 and the items 1805 have been placed into the system 1800 by placing the items 1805 onto the item platform 1830 and/or placing the source tray 1880 onto the source tray platform 1840, the process continues to the configuration shown in FIG. 20. As shown in FIG. 20, the pedal 1820 travels to a depressed position (e.g., by being pushed downward by a foot of an operator). As the pedal 1820 is depressed, the pushers 1822 travel upward along the vertical tracks 1816. As the pushers 1822 extend through the slots 1852 (not visible in FIG. 20), the upper ends of the pushers 1822 push the inner surface 1892 upward such that the inner surface 1892 is at a similar height to the surface of the item shelf 1830 at the end of the transition segment 1836. For example, the inner surface 1892 of the process tray 1890 may be raised relative to the rigid sides of the process tray 1890, as shown in FIG. 20 to facilitate the transfer of the items 1805 into the process tray 1890. In some embodiments, the system 1800 can include one or more motors configured to raise the pushers 1822 and/or depress the pedal 1820 responsive to an operator input and/or automatically based on detection of a process tray 1890 on the process tray platform 1850.

Figure 21:
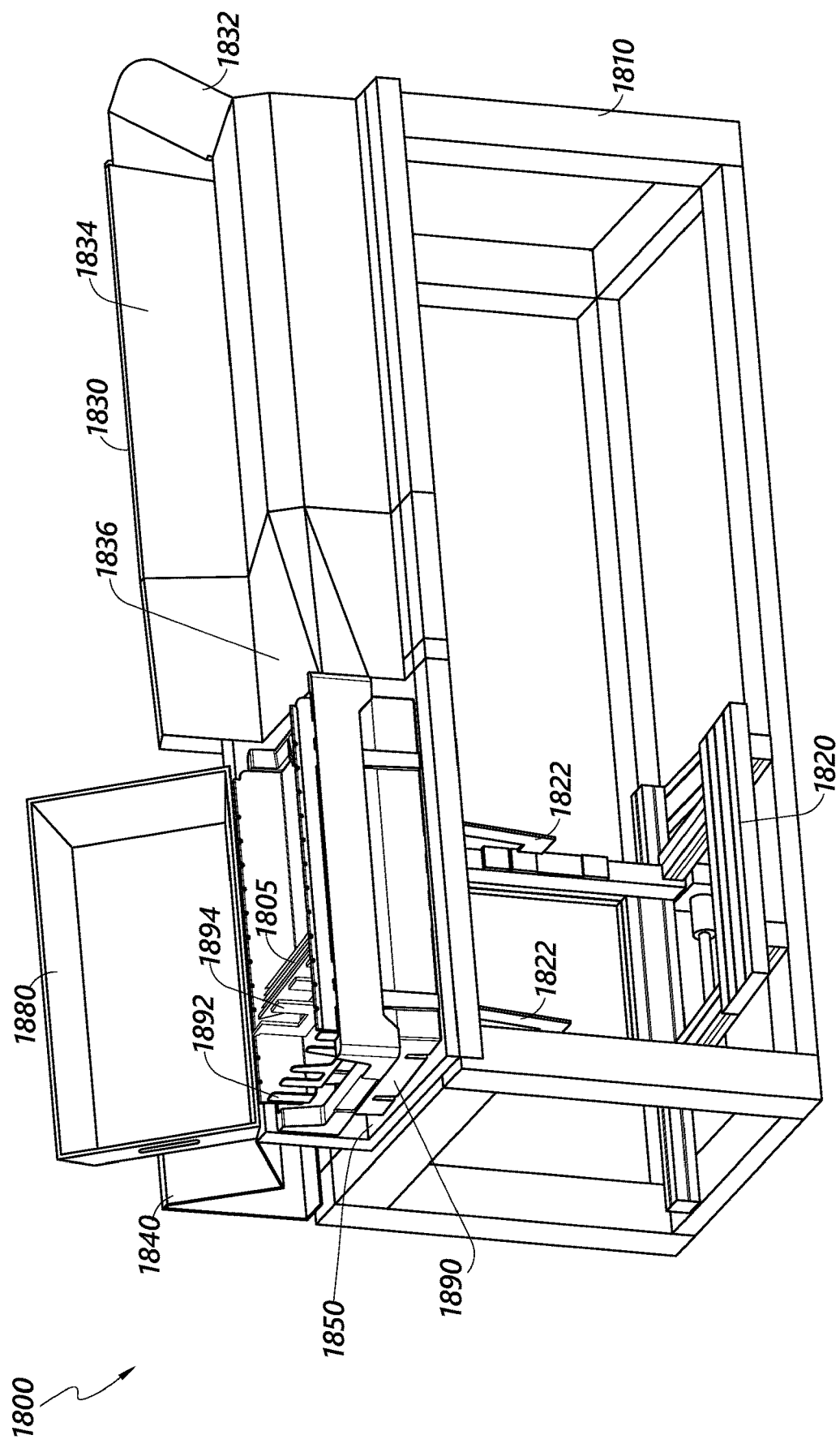
FIG. 21 is a perspective view of a third state of the tray content transfer system of FIG. 19 during the exemplary tray content transfer process of FIGS. 19-20.

Referring now to FIG. 21, after the pedal 1820 is depressed to raise the inner surface 1892 of the process tray 1890, the items 1805 are moved into the process tray 1890. The items 1805 that were contained in the source tray 1880 can be manually moved horizontally and/or vertically out of the source tray 1880 and placed onto the inner surface 1892. In this case, the elevated position of the inner surface 1892 can facilitate the transfer of the items 1805 from the source tray 1880 to the process tray 1890, by decreasing the vertical distance the items 1805 must be moved manually or mechanically (e.g., by grippers or other mechanical movers as depicted in the other figures), reducing the probability of dropping the items 1805 during the transfer.

The items 1805 that were located on the item platform 1830 can slide along the bottom surface 1832 and the transition segment 1836 onto the inner surface 1892 of the process tray 1890. In this case, the elevated position of the inner surface 1892 can allow the items 1805 to slide from the item platform 1830 into the process tray 1890 at substantially the same or similar height, such that the items 1805 do not need to be picked up and thereby reducing the probability of dropping the items 1805 during the transfer. In some embodiments, the sliding of the items 1805 along the item platform 1830 can be performed automatically, such as by one or more paddles or other item moving members sliding the items 1805.

Figure 22:
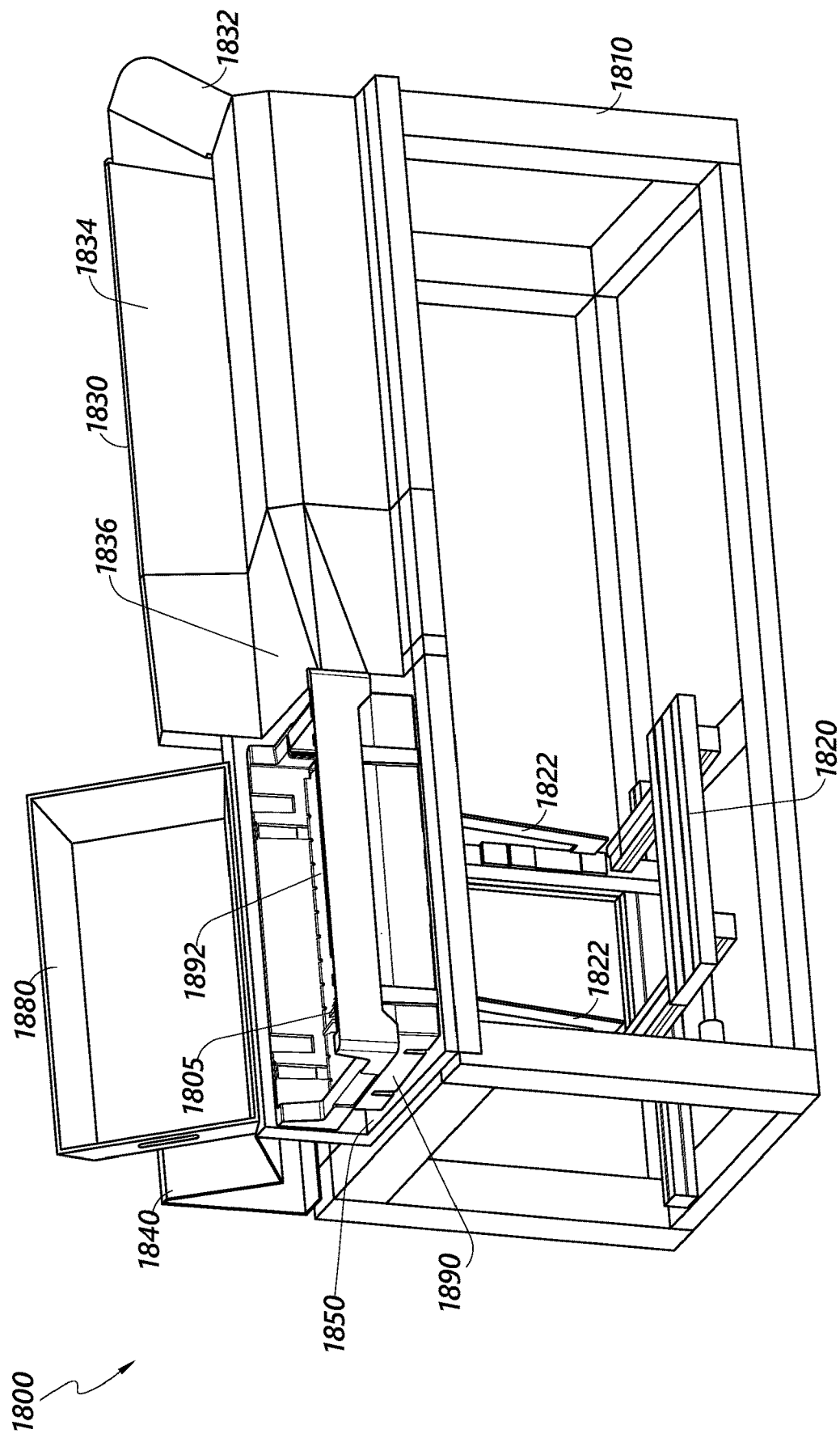
FIG. 22 is a perspective view of a fourth state of the tray content transfer system of FIG. 19 during the exemplary tray content transfer process of FIGS. 19-21.

Referring now to FIG. 22, after the items 1805 are moved into the process tray 1890, the pedal 1820 is released and moves upward to its original position. As the pedal 1820 is released, the pushers 1822 travel downward along the vertical tracks 1816. When the pushers 1822 travel downward, the inner surface 1892 of the process tray 1890 is allowed to travel downward to rest within the process tray 1890. The system 1800 is thus in its original position, and the source tray 1880 and process tray 1890 can be removed. In some embodiments, the pushers 1822 can be moved downward by one or more motors, responsive to an operator input or other indication that the items 1805 have been transferred. The tray content transfer process can be repeated indefinitely as additional source trays 1880 and/or items 1805 arrive with contents to be transferred.

Figure 23A:
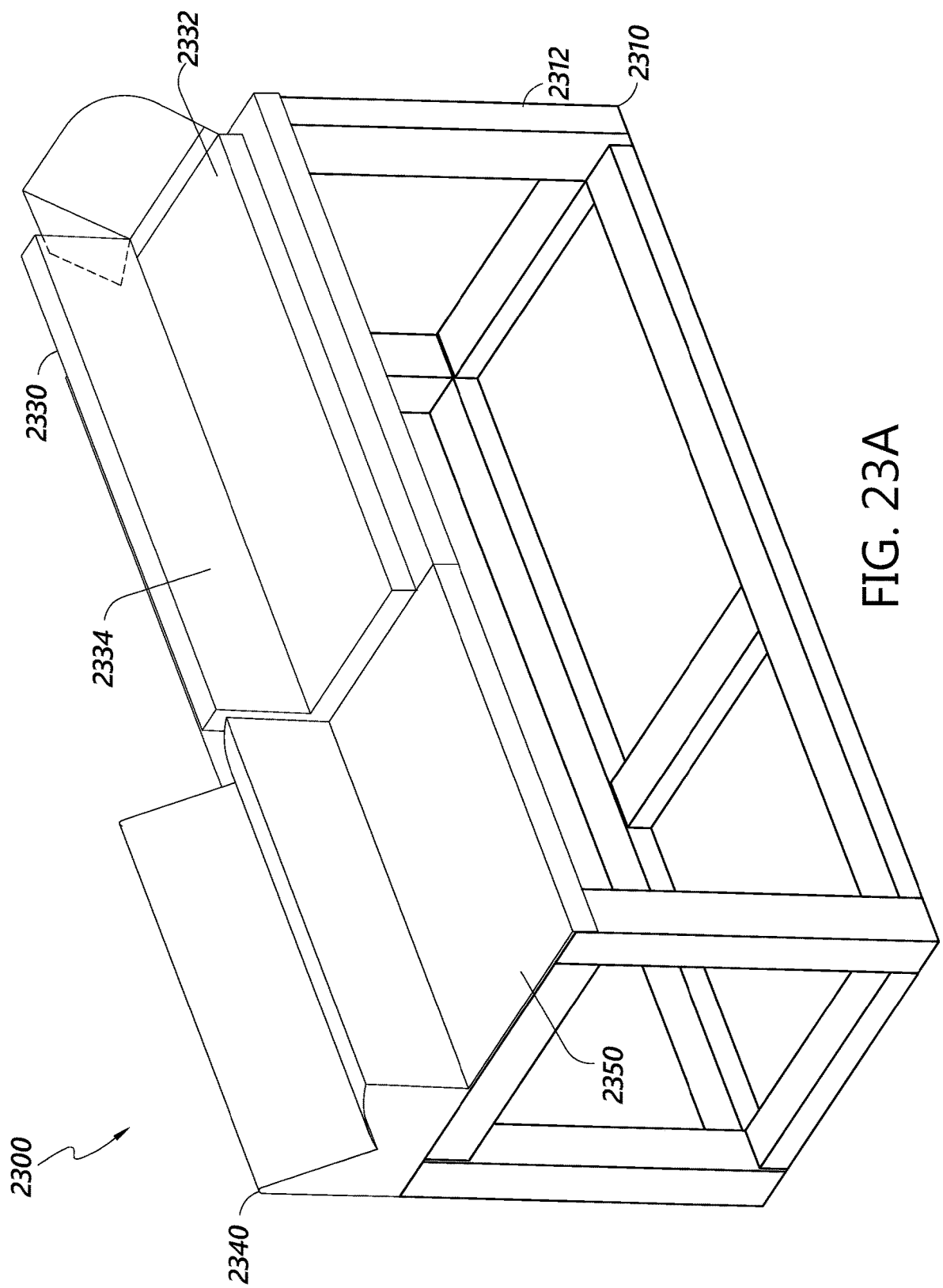
FIG. 23A is a front perspective view of an exemplary tray content transfer system.

FIG. 23A is a front perspective view of a tray content transfer system 2300 in accordance with an exemplary embodiment. The tray content transfer system 2300 generally includes a frame 2310, an item platform 2330, a source tray platform 2340, and a process tray platform 2350.

The frame 2310 is generally configured to provide a stable support for the item platform 2330, the source tray platform 2340, and the process tray platform 2350. The frame 2310 includes various structural members 2312 connected to form a stable structure. In various embodiments, the frame 2310 can be any size, shape, or configuration suitable to support the item platform 2330, the source tray platform 2340, and the process tray platform 2350. For example, the frame 2310 can be built into a wall, a shelf, a floor, or the like, and need not be a free-standing rectangular frame as shown in the figures.

The process tray platform 2350 is a generally rigid horizontal surface sized to accommodate a process tray. In various embodiments, at least a portion of the process tray platform 2350 can be a solid, flat surface, and/or can include a textured surface, a grating, a mesh, a plurality of longitudinal members, or the like. As shown in FIGS. 24-27, the process tray platform 2350 has a length and width selected to accommodate a process tray 2390 resting thereon.

The item platform 2330 is a shelf located at a second location proximate the process tray platform 2350. The item platform 2330 includes a bottom surface 2332 and a rear surface 2334. The item platform 2330 can include a generally rigid material, and/or can be at least partially formed from a textured surface, a grating, a mesh, or the like. In some embodiments, the bottom surface 2332 can be generally flat, or can be slanted backward toward the rear surface 2332 (e.g., with a transition segment provided similar to the transition segment 1836 depicted in FIG. 18). As shown in FIGS. 24-27, the item platform 2330 is configured to receive items 2305 that are not in a source tray 2380, and to accommodate sliding of the items 2305 along the bottom surface 2332 into a process tray 2390. Accordingly, the height of the bottom surface 2332 relative to the height of the process tray platform 2350 may be selected based on the thickness of the bottom of a process tray 2390 to be used with the tray content transfer system 2300. For example, if the height difference between the bottom surface 2332 and the process tray platform 2350 is equal to the thickness of the bottom of the process tray, an inner surface of the process tray on the process tray platform 2350 will be at the same height as the bottom surface 2332 so as to facilitate the sliding of items from the item platform 2330 into the process tray.

Figure 23B:
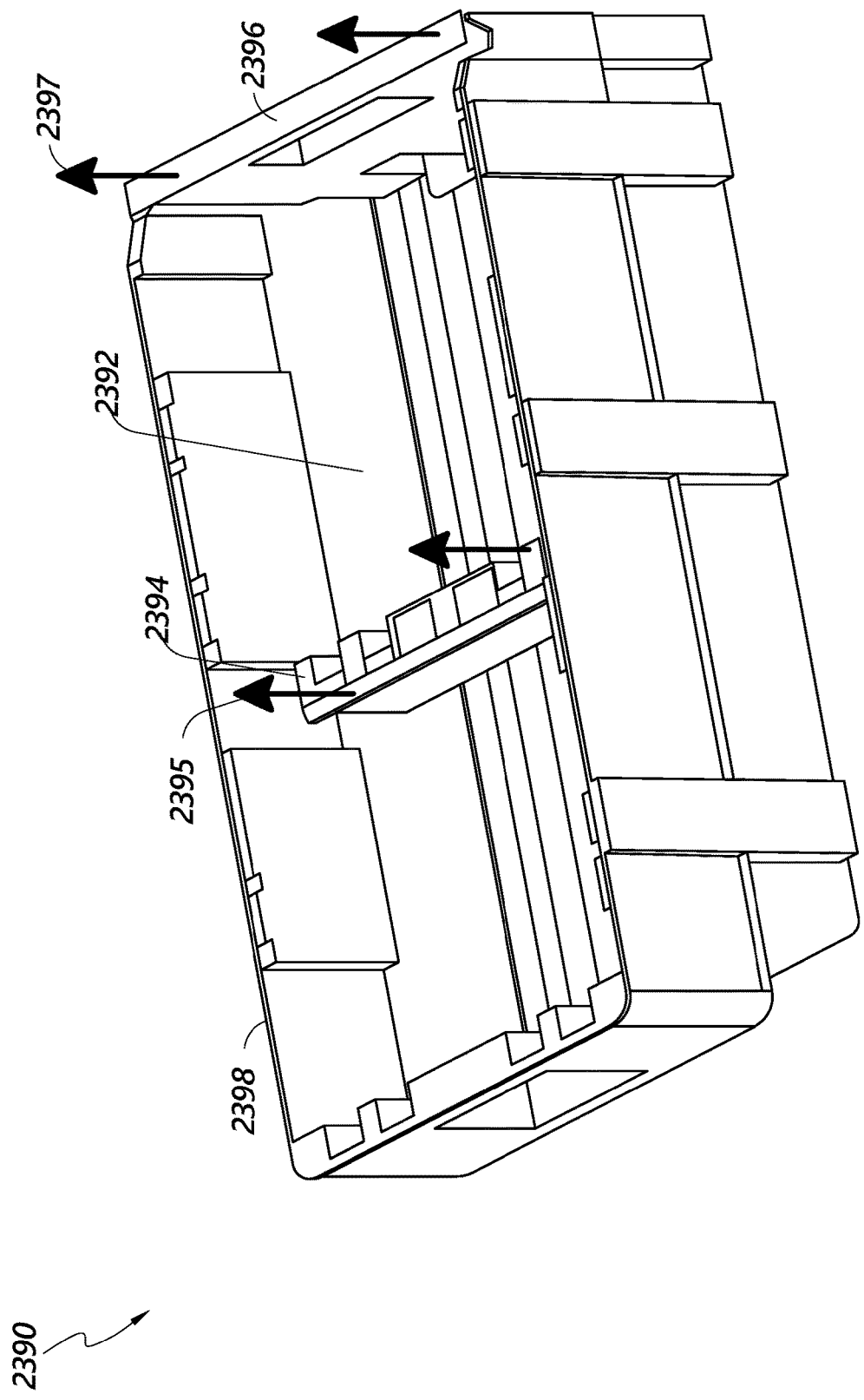
FIG. 23B is a front perspective view of an exemplary process tray compatible with the tray content transfer systems described herein.

FIG. 23B depicts an example process tray 2390 configured for use with the tray content transfer system 2300 depicted in FIG. 23A. The process tray 2390 includes an inner surface 2392, a movable divider 2394, a removable end wall 2396, and side walls 2398. The inner surface 2392 and the side walls 2398 generally support and contain items within the process tray 2390. The end wall 2396 can be removed by sliding the end wall 2396 out of the process tray 2390 along the direction indicated by arrow 2397. For example, the end wall 2396 may be removed to allow items to be transferred into the process tray 2390 by sliding. After the items slide onto the inner surface 2392, the end wall 2396 may be replaced by moving in a direction opposite arrow 2397. Similarly, the divider 2394 may be removed from the process tray 2390 by sliding the divider 2394 along the direction indicated by arrow 2395. The divider 2394 may be reinserted at a different location along the inner surface 2392, for example, based on the amount of space required to accommodate items that will be placed into the process tray 2390.

Figure 24:
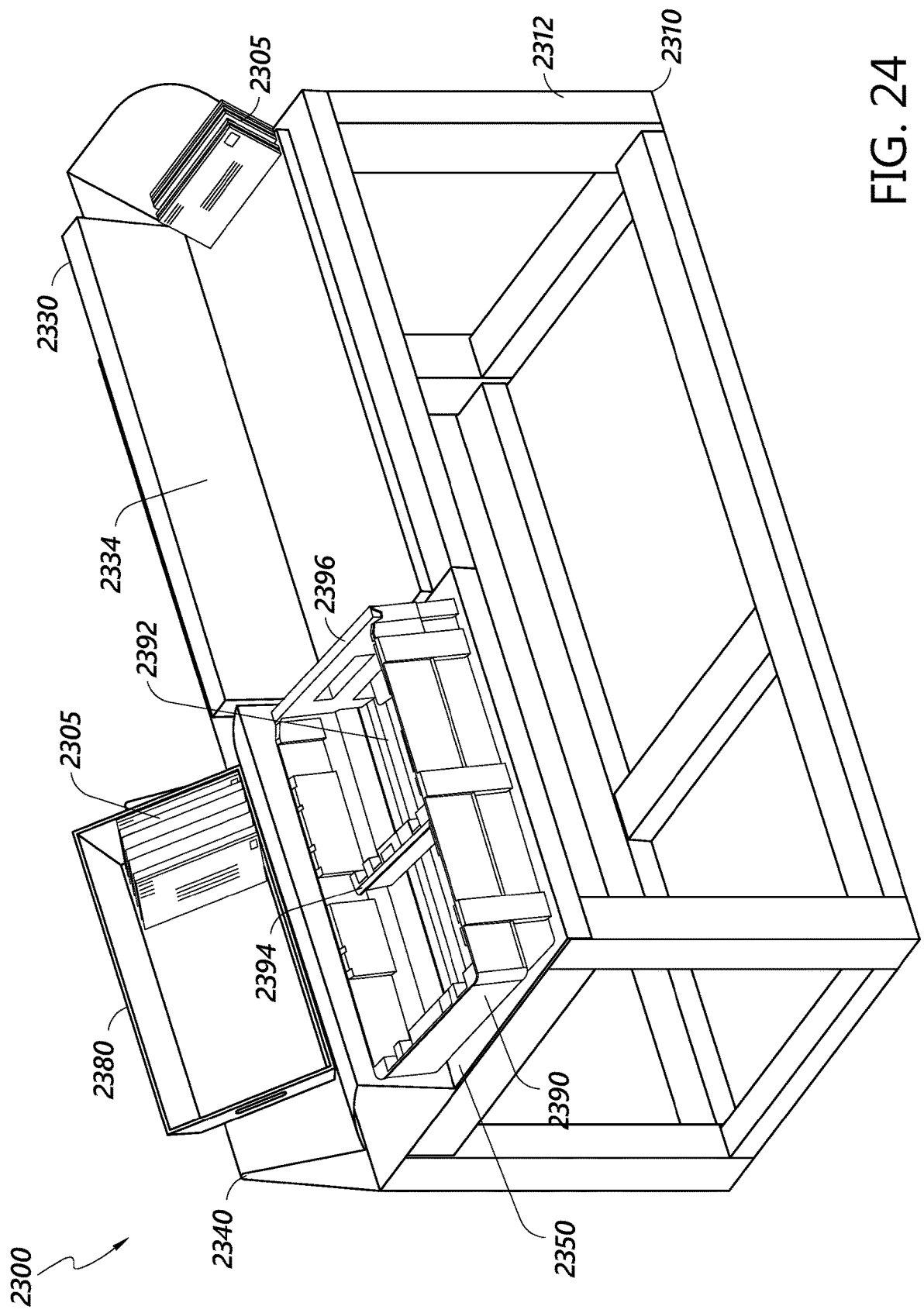
FIG. 24 is a perspective view of an initial state of a tray content transfer system during an exemplary tray content transfer process.

FIG. 24 depicts an initial state of the tray content transfer system 2300 for a transfer process. In the initial state, the items 2305 can be contained within the source tray 2380 and/or on the item platform 2330. The items can be, for example, letters, flats, etc. In the initial state of FIG. 24, the process tray 2390 has been placed onto the process tray platform 2350. The divider 2394 has been positioned at an intermediate location along the inner surface 2392 of the process tray 2390, for example, based on the number and/or volume of items 2305 to be transferred. The source tray 2380 has been placed onto the source tray platform 2340 so that it sits at an angle relative to the process tray 2390. Alternatively or in addition to placing the source tray 2380 onto the source tray platform 2340, items 2305 can be placed onto the item platform 2330. For example, loose items 2305 may not be received in a source tray 2380, and/or an operator of the tray content transfer system 2300 may prefer to transfer items from a source tray 2380 to the item platform 2330 rather than place the entire source tray 2380 onto the source tray platform 2340.

Figure 25:
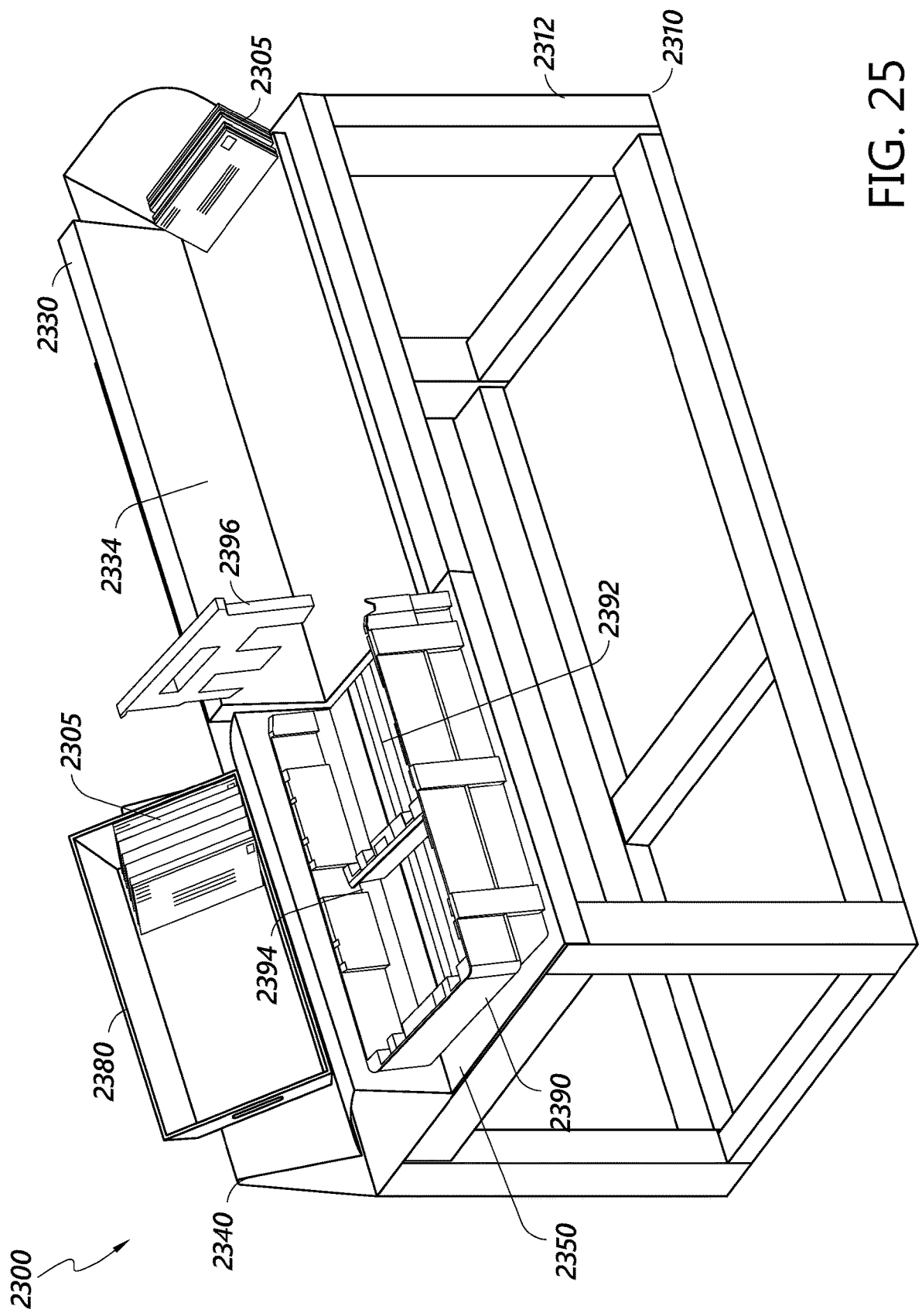
FIG. 25 is a perspective view of a second state of the tray content transfer system of FIG. 24 during the exemplary tray content transfer process of FIG. 24.

After the process tray 2390 has been placed onto the process tray platform 2350 and the items 2305 have been placed into the system 2300 by placing the items 2305 onto the item platform 2330 and/or placing the source tray 2380 onto the source tray platform 2340, the process continues to the configuration shown in FIG. 25. As shown in FIG. 25, the removable end wall 2396 has been lifted out of the process tray 2390 to enable the sliding of items 2305 from the item platform 2330 into the process tray 2390. In the exemplary embodiment depicted, the bottom surface 2332 of the item platform is at approximately the same height as the inner surface 2392 of the process tray 2390.

Figure 26:
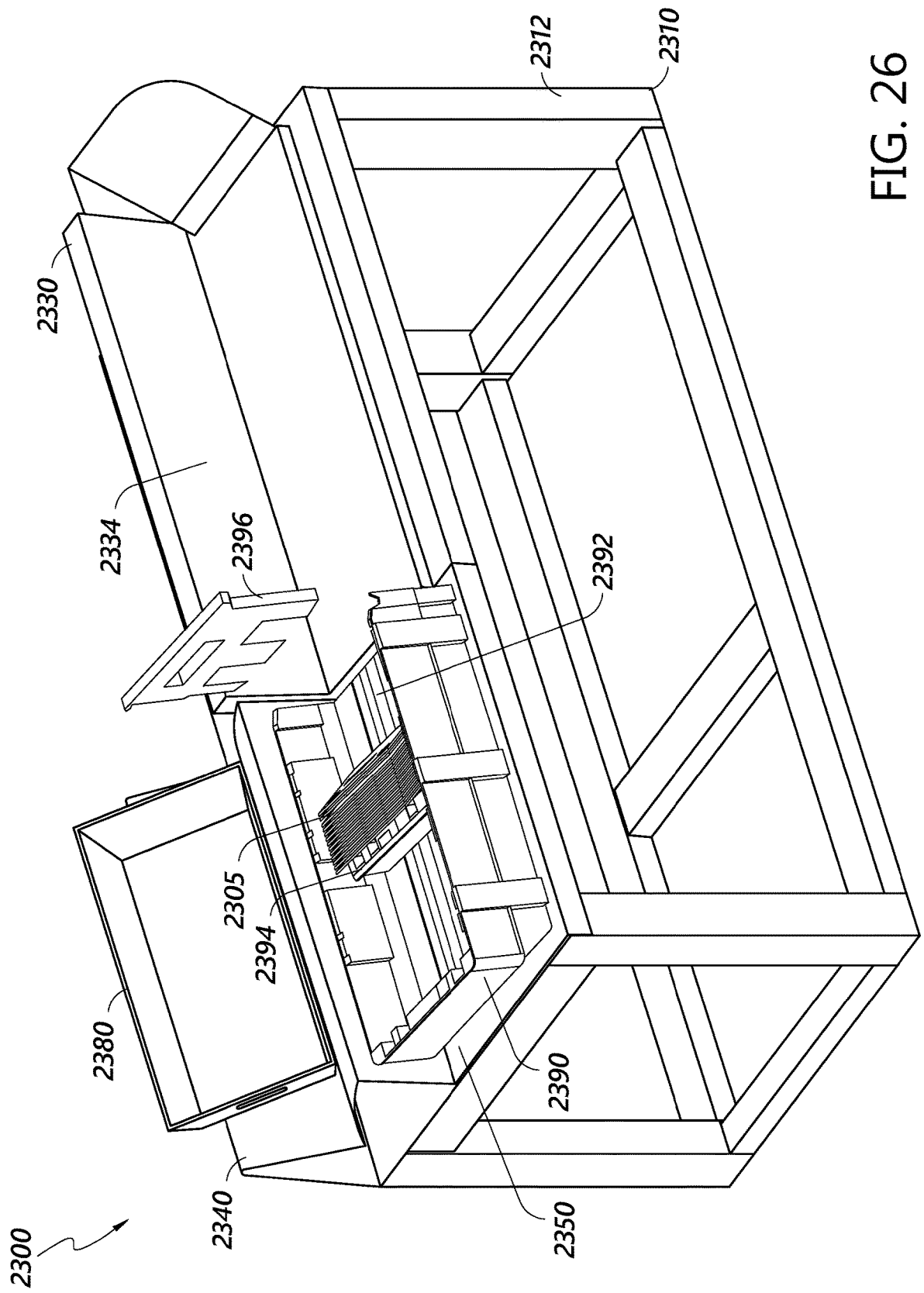
FIG. 26 is a perspective view of a third state of the tray content transfer system of FIG. 24 during the exemplary tray content transfer process of FIGS. 24-25.

After the removable end wall 2396 has been lifted out of the process tray 2390, the process continues to the configuration shown in FIG. 26. As shown in FIG. 26, the items 2305 have been placed into the process tray 2390. The items 2305 previously located on the item platform 2330 have been transferred along the bottom surface 2332 of the item platform 2330 into the process tray 2390. The items 2305 previously located within the source tray 2380 have been lifted out of the source tray 2380 and lowered into the process tray 2390. In implementations in which items 2305 are only being transferred from a source tray 2380 and not from the item platform 2330, it will be appreciated that the end wall 2396 of the process tray 2390 need not be lifted to facilitate the transfer of items 2305.

Figure 27:
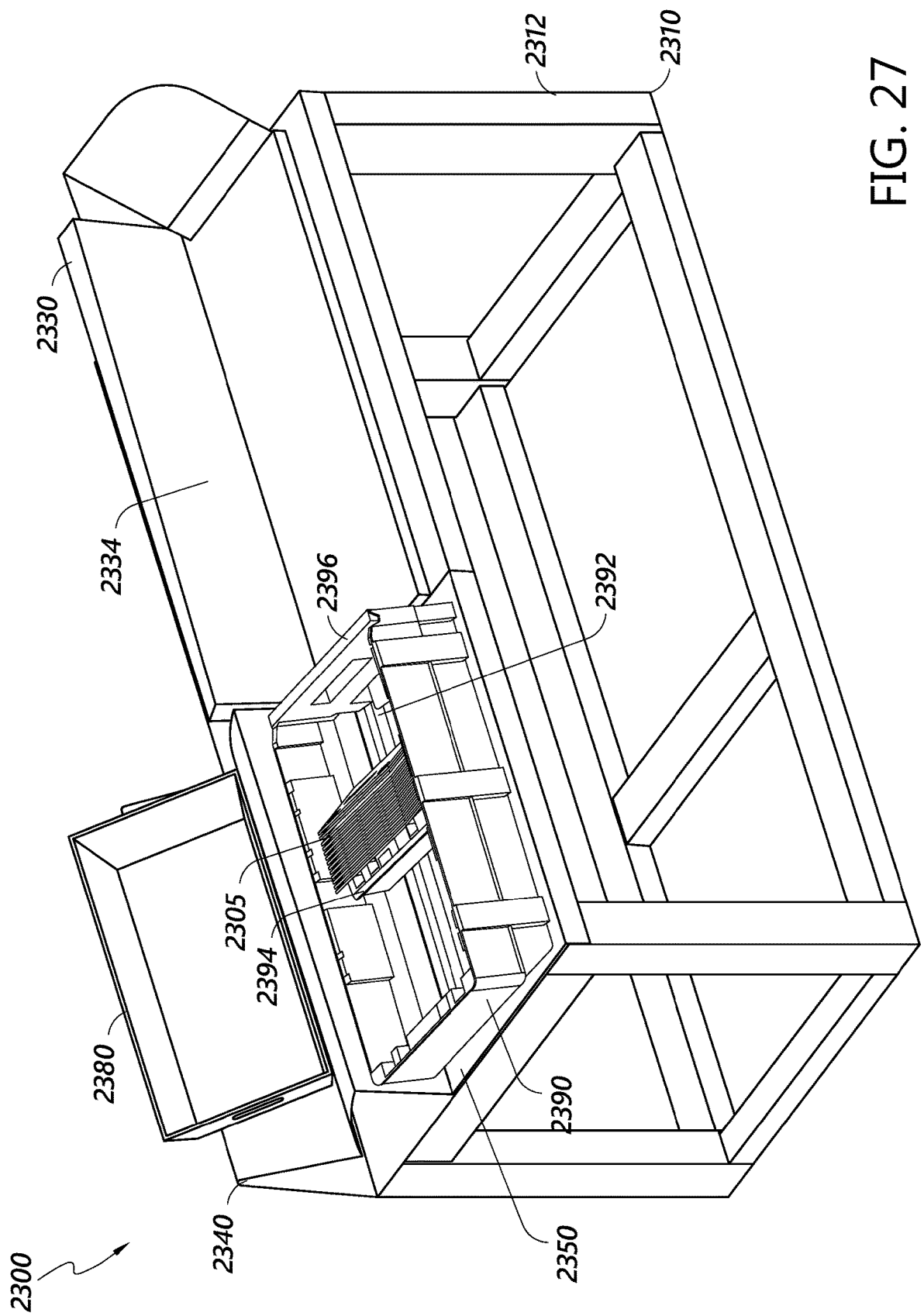
FIG. 27 is a perspective view of a fourth state of the tray content transfer system of FIG. 24 during the exemplary tray content transfer process of FIGS. 24-26.

Referring now to FIG. 27, after the items 2305 are moved into the process tray 2390, the end wall 2396 is lowered to the position depicted in FIG. 27. The process tray 2390 is thus in its original configuration and contains the items 2305 therein. The process tray 2390 can thus be removed from the system 2300 for further processing or transport of the items 2305. The tray content transfer process depicted in FIGS. 24-27 can be repeated indefinitely as additional source trays 2380 and/or items 2305 arrive with contents to be transferred.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A tray content transfer system comprising:
a frame configured to rotate about a rotation axis between an upright orientation and a rotated orientation;
a first retainer coupled to the frame and configured to secure a first tray within the tray content transfer system, the first tray containing one or more items;
a second retainer coupled to the frame and configured to secure a second tray within the tray content transfer system at a location spaced from the first tray along a longitudinal axis parallel to the rotation axis;
a paddle assembly movably coupled to the frame, the paddle assembly comprising a plurality of paddles, wherein the distance between the paddles is adjustable to selectively engage and release items at least partially disposed between the paddles, and wherein the paddle assembly is movable relative to the frame along a first linear axis parallel to the longitudinal axis and a second linear axis perpendicular to the first linear axis; and
a plurality of motors configured to adjust the distance between the paddles, to move the paddle assembly along the first linear axis and the second linear axis, and to rotate the frame about the rotation axis, in a predetermined sequence to transfer the one or more items from the first tray to the second tray.

2. The tray content transfer system of claim 1, wherein the predetermined sequence comprises:
while the frame is in the upright orientation, causing the paddle assembly to engage the one or more items within the first tray;
rotating the frame to the rotated orientation;
moving the paddle assembly out of the first tray along the second linear axis;
moving the paddle assembly along the first linear axis to a position proximate the second tray;
moving the paddle assembly to a position at least partially within the second tray;
rotating the frame to the upright orientation; and
causing the paddle assembly to release the one or more items into the second tray.

3. The tray content transfer system of claim 1, wherein the rotated orientation is rotated by at least 90° relative to the upright orientation.

4. The tray content transfer system of claim 1, wherein the paddle assembly comprises a back plate disposed perpendicular to and at least partially between the paddles such that the one or more items rest at least partially on the back plate when the frame is in the rotated orientation.

5. The tray content transfer system of claim 4, wherein the paddle assembly comprises a plurality of slidably offset back plates, each back plate in a fixed position relative to one of the plurality of paddles.

6. The tray content transfer system of claim 5, wherein the slidably offset back plates are at least partially overlapping such that the slidably offset back plates span substantially the entire distance between the plurality of paddles.

7. The tray content transfer system of claim 4, wherein the rotated orientation is rotated by more than 90° relative to the upright orientation, the paddle assembly further comprising a top plate disposed perpendicular to the back plate and disposed perpendicular to and at least partially between the paddles, such the back plate and the top plate retain the one or more items within the paddle assembly when the frame is in the rotated orientation.

8. The tray content transfer system of claim 1, wherein the first retainer comprises at least one end pusher configured to space the one or more items from an inner wall of the first tray.

9. The tray content transfer system of claim 8, wherein the at least one end pusher is configured to simultaneously secure the first tray relative to the frame and to space the one or more items from the inner wall by moving inwardly through one or more openings in side walls of the first tray.

10. The tray content transfer system of claim 1, further comprising a conveyor coupled to the frame, the conveyor configured to move a first tray or a second tray along the frame parallel to the longitudinal axis while the frame is in the upright orientation.

11. The tray content transfer system of claim 1, further comprising a sensor configured to detect the presence of the first tray or the second tray within the tray content transfer system, wherein the plurality of motors are configured to initiate the predetermined sequence based at least in part on detecting the presence of the first tray or the second tray.

12. A method for transferring items from a tray, the method comprising, by an automated process:
securing a first tray containing one or more items at a first location within a tray content transfer system;
securing a second tray within the tray content transfer system at a second location spaced along a longitudinal axis from the first location;
securing the one or more items relative to the first tray;
rotating the first tray and the second tray simultaneously about a rotation axis parallel to the longitudinal axis from an upright orientation to a rotated orientation;
while the first tray and the second tray are in the rotated orientation:
moving the one or more items out of the first tray;
moving the one or more items parallel to the longitudinal axis to a position adjacent to the second tray; and
moving the one or more items into the second tray;
rotating the first tray and the second tray simultaneously about the rotation axis from the rotated orientation to the upright orientation;
releasing the one or more items into the second tray; and
releasing the first tray and the second tray.

13. The method of claim 12, wherein the rotated orientation is rotated by at least 90° relative to the upright orientation.

14. The method of claim 12, further comprising engaging the one or more items between a plurality of paddles, wherein the one or more items remain engaged between the plurality of paddles while the first tray and the second tray are in the rotated orientation.

15. The method of claim 12, further comprising resting the one or more items on one or more back plates of a paddle assembly of the tray content transfer system while the first tray and the second tray are in the rotated orientation.

16. The method of claim 12, wherein securing the first tray comprises fixing the first tray relative to a frame of the tray content transfer system, and wherein securing the second tray comprises fixing the second tray relative to the frame.

17. The method of claim 16, wherein rotating the first tray and the second tray comprises rotating the frame about the rotation axis relative to a ground surface.

18. The method of claim 12, wherein the method is initiated based at least in part on a detection of the presence of the first tray or the second tray within the tray content transfer system.

19. The method of claim 12, wherein the second tray is an automation-compatible tray and the first tray is not an automation-compatible tray.

20. A tray content transfer apparatus comprising:
means for securing a first tray and a second tray within the tray content transfer apparatus, the first tray containing one or more items;
means for engaging the one or more items within the first tray;
means for simultaneously rotating the first tray and the second tray about a horizontal rotational axis between an upright orientation and a rotated orientation;
means for, while the first tray and the second tray are in the rotated orientation, removing the one or more items from the first tray along a first horizontal path, moving the items to a position proximate the second tray along a second horizontal path to a position adjacent to the second tray, and moving the items into the second tray along a third horizontal path parallel to the first horizontal path; and
means for, while the first tray and the second tray are in the upright orientation, releasing the one or more items into the second tray.

* * * * *